United States Patent [19]
Starr

[11] Patent Number: 5,175,825
[45] Date of Patent: Dec. 29, 1992

[54] HIGH SPEED, FLEXIBLE SOURCE/DESTINATION DATA BURST DIRECT MEMORY ACCESS CONTROLLER

[75] Inventor: Daryl D. Starr, Milpitas, Calif.

[73] Assignee: Auspex Systems, Inc., Santa Clara, Calif.

[21] Appl. No.: 474,534

[22] Filed: Feb. 2, 1990

[51] Int. Cl.$^5$ .................. G06F 13/14; G06F 13/28
[52] U.S. Cl. .................. 395/325; 364/242.31; 364/260; 364/DIG. 1; 395/425
[58] Field of Search ... 364/200 MS File, 900 MS File; 395/325, 425

[56] References Cited

U.S. PATENT DOCUMENTS

| | | | |
|---|---|---|---|
| 4,500,985 | 2/1985 | Chang | 370/14 |
| 4,577,273 | 3/1986 | Hopper et al. | 364/200 |
| 4,620,279 | 10/1986 | Read et al. | 364/200 |
| 4,663,730 | 5/1987 | Ikeda | 395/775 |
| 4,674,037 | 6/1987 | Funabashi et al. | 364/200 |
| 4,722,051 | 1/1988 | Chattopadhya | 364/200 |
| 4,837,677 | 6/1989 | Burrus, Jr. et al. | 364/200 |
| 5,019,966 | 5/1991 | Saito et al. | 395/775 |
| 5,081,701 | 1/1992 | Silver | 395/325 |

Primary Examiner—Thomas C. Lee
Assistant Examiner—Ayni Mohamed
Attorney, Agent, or Firm—Fliesler, Dubb, Meyer & Lovejoy

[57] ABSTRACT

A direct memory access control system provides for the high speed burst transfer of data blocks from a data source to a data destination. The system includes a first processor for identifying one or more data blocks for transfer from a data source to a data destination and prepares a data structure defining the data transfer required for the transfer of the data block. A second processor, responsive to an enable signal, autonomously generates addressing signals and data transfer signals to effect the transfer of a data block from the data source to the data destination. Upon completion of a transfer, the second processor generates a transfer done signal. A third processor, responsive to the first processor, is provided to initialize the second processor for the transfer of a data block determined by the defining data structure as prepared by the first processor. The third processor, in response to the transfer done signal, initializes the second processor and provides the enable signal autonomously with respect to the first processor.

8 Claims, 21 Drawing Sheets

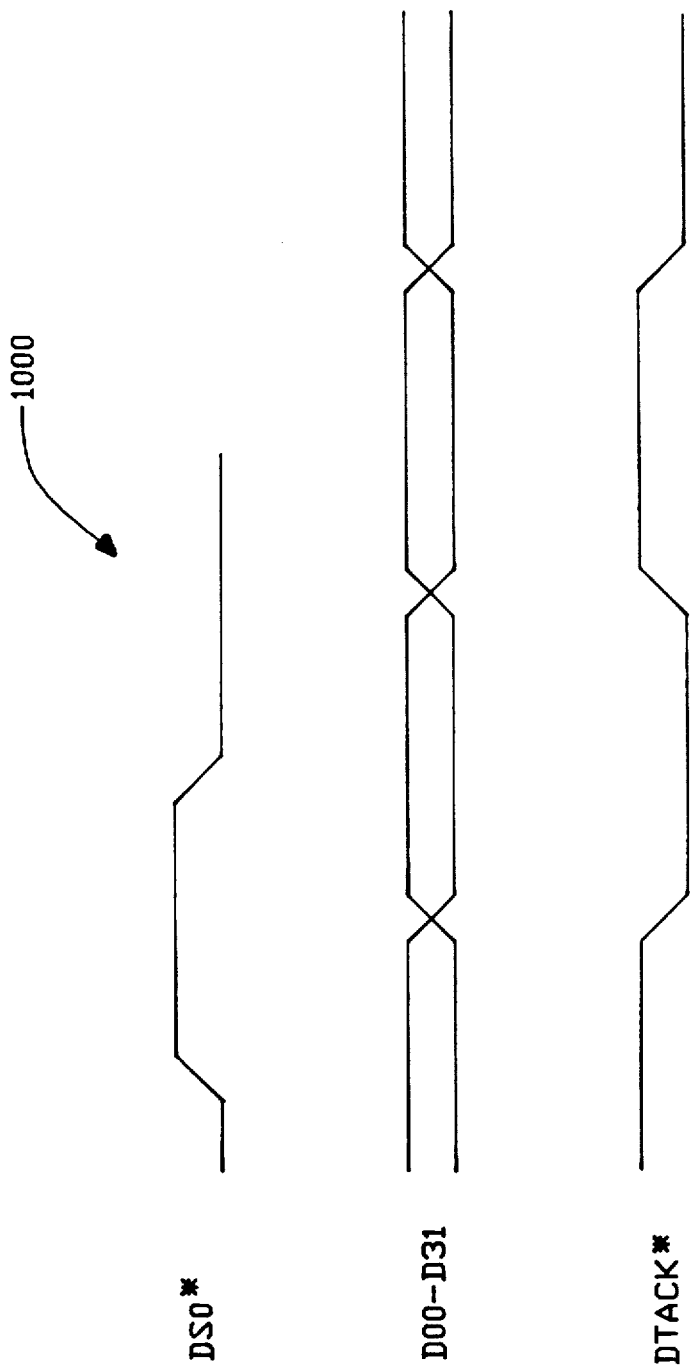

HIGH SPEED, FLEXIBLE SOURCE/DESTINATION DATA BURST DIRECT MEMORY ACCESS CONTROLLER

CROSS-REFERENCE TO RELATED APPLICATIONS

The present application is related to the following U.S. patent applications:

1. MULTIPLE FACILITY OPERATING SYSTEM ARCHITECTURE, inventors: David Hitz, Allan Schwartz, James Lau, and Guy Harris ; Ser. No. 07/404,885, filed Sep. 8, 1989, now abandoned.

2. PARALLEL I/O NETWORK FILE SERVER ARCHITECTURE, inventors: John Row, Larry Boucher, William Pitts, and Steve Blightman; Ser. No. 07/404,959, filed Sep. 8, 1989;

3. ENHANCED VMEBUS PROTOCOL UTILIZING SYNCHRONOUS HANDSHAKING AND BLOCK MODE DATA TRANSFER, inventor: Daryl D. Starr; Ser. No. 07/405,636, filed Sep. 8, 1989, now abandoned;

4. BUS LOCKING FIFO MULTI-PROCESSOR COMMUNICATION SYSTEM invented by William Pitts, Stephen Blightman and Daryl D. Starr; Ser. No. 07/474,350, filed Feb. 2, 1990, now abandoned.

The above applications are all assigned to the assignee of the present invention and are all expressly incorporated herein by reference.

FIELD OF THE INVENTION

The present invention is generally related to direct memory access (DMA) controllers and multiprocessor computer systems that use DMA controllers and, in particular, to a high speed DMA controller that provides for multiple source to multiple destination data transfers including a high speed data bus interconnecting multiple processor systems.

BACKGROUND OF THE INVENTION

Over the past several years, the computer industry has experienced a remarkable evolution in the architecture of technical and office computing systems. Distributed "smart" workstations have increasingly replaced the simple "dumb" terminal attached to a mainframe or microcomputer. These "smart" workstations are, themselves, computers having local processing ability and local memory storage. Such "smart" workstations comprise part of a larger network, which includes a wide variety of processors, data storage and communication devices, and other peripherals.

A workstation network generally consists of individual user workstations (referred to as "clients") and shared resources for filing, data storage, printing and wide-area communications (referred to individually as "servers"). The clients and servers are interconnected along a local area network ("LAN"), such as an ethernet. Multiple ethernets may be connected to one another by a backbone ethernet.

Clients along an ethernet are typically connected to a server providing the clients with data and storage facilities. Servers that primarily provide for file storage access are referred to as "file servers". A conventional server might include a central processing unit ("CPU") coupled to the ethernet. The CPU itself is coupled to a primary memory device. Both the CPU and the primary memory device are connected to a conventional input-output device ("I/O"), such as a bus. Using the bus, the CPU may communicate with other devices such as disk controllers, for mass storage, or other peripheral devices.

Although processor technology and performance has increased significantly in recent years, input/output performance has not commensurately improved to date. Thus, although the processing performance capabilities of the CPU are considerable, the overall performance of the system is less formidable due to the lower performance threshold of I/O embodied in the bus.

The level of performance of any bus is largely determined by the time required to execute data transfer transactions across the bus. If the transaction time for a given transaction across the bus can be optimized to the shortest period of time possible, the bus will be capable of handling more transactions in a given period of time. Hence, performance is increased as the bus is capable of handling a greater number of transactions during a given period of time.

The VME backplane bus (hereinafter "VMEbus") is one of the most popular I/O bus systems presently in use. The VMEbus is widely implemented and standard throughout the industry. To this end, the Standards Committee of the Institute of Electrical and Electronics Engineers ("IEEE") has formulated and published VMEbus standards in a publication entitled *VMEbus Specification Manual*, revision D1.2. (hereinafter "the VMEbus standard"), which is hereby incorporated by reference.

The standard VMEbus interface system consists of backplane interface logic, four groups of signal lines referred to as "buses," and a collection of functional modules which communicate with one another using the signal lines. The four buses are the data transfer bus ("DTB"), arbitration bus, priority interrupt bus and utility bus. The present application is principally concerned with the DTB.

The DTB allows "masters," which are functional modules, such as the CPU or other intelligent controllers connected to the VMEbus, that initiate DTB cycles, to direct the transfer of binary data between themselves and "slaves." A "slave" is a functional module, such as primary memory, which detects DTB cycles initiated by a "master" and, when those cycles specify its participation, transfers data to or receives data from its "master."

There are seven DTB cycles which a "master" may implement on the DTB: READ, WRITE, BLOCK READ, BLOCK WRITE, READ-MODIFY-WRITE, ADDRESS ONLY, and INTERRUPT ACKNOWLEDGE CYCLE.

In a READ cycle, one, two, three or four bytes of parallel data are transferred across the DTB from master to slave. The READ cycle begins when the master broadcasts an address and an address modifier and places data on the DTB. Each slave captures the address and address modifier and determines whether it is to respond to the cycle. The intended slave recipient retrieves the data from its internal storage and places the data on the DTB, acknowledging the data transfer.

In a WRITE cycle, one, two, three or four bytes of parallel data are transferred across the bus from a master to a slave. The cycle commences when the master broadcasts an address and address modifier and places data on the DTB. Each slave on the bus captures the address and address modifier and determines whether it is to respond to the cycle. The intended slave(s) stores the data and acknowledges the transfer.

The BLOCK READ cycle is a DTB cycle used to transfer a block of one to two-hundred fifty-six bytes from a slave to a master. The BLOCK READ transfer is accomplished using a string of one, two or four byte-wide (i.e., 8, 16, or 32 bit-wide data words) data transfers. Once the block transfer is started, the master does not release the DTB until all of the bytes have been transferred. The BLOCK READ cycle differs from a string of READ cycles in that the master broadcasts only one address and address modifier at the beginning of the cycle. The slave increments the address on each transfer in order that the data for the next transfer is retrieved from the next higher location.

The BLOCK WRITE cycle, like the BLOCK READ cycle, is a DTB cycle used to transfer a block of one to two-hundred fifty-six bytes from a master to a slave. The BLOCK WRITE transfer is accomplished using a string of one, two or four byte-wide data transfers. Once the block transfer is started, the master does not release the DTB until all of the bytes have been transferred. The BLOCK WRITE cycle differs from a string of WRITE cycles in that the master broadcasts only one address and address modifier at the beginning of the cycle. The slave increments the address on each transfer in order that the data for the next transfer is retrieved from the next higher location.

The READ-MODIFY cycle is a DTB cycle used to both read from and write to a slave location without permitting another master access to the slave location.

The ADDRESS-ONLY cycle consists only of an address broadcast. Data is not transferred. Slaves do not acknowledge ADDRESS-ONLY cycles and the master terminates the cycle without waiting for an acknowledgement.

It should be noted that this differs from "synchronous" systems in that in totally "synchronous" systems the response of the slave is irrelevant. This initiation of a DTB cycle is referred to in the art as "handshaking." After a master initiates a data transfer cycle it waits for the designated slave to respond before finishing the cycle. The asynchronous nature of the VMEbus allows a slave to take as long as it needs to respond. The VMEbus requires four propagations across the DTB to complete a single handshake sequence. If a slave fails to respond because of a malfunction or if the master accidentally addresses a location where there is no slave, the bus timer intervenes allowing the cycle to be terminated.

The VMEbus standard specifies the use of location monitors, which are on the functional modules, to monitor data transfers over the DTB. Each operates to detect accesses to the locations it has been assigned to watch. When an access to one of these assigned locations occurs, the location monitor typically signals its on-board processor by means of an interrupt request signal. In such a configuration, if processor A writes into the global VMEbus memory monitored by processor B's location monitor, processor B will be interrupted.

The DTB includes three types of lines: addressing lines, data lines and control lines.

Masters use address lines numbers 2 through 31, denoted as A02 through A31, to select a four-byte group to be accessed. Four additional lines, data strobe zero (DS0*), data strobe one (DS1*), address line number one (A01) and longword (LWORD*), are then used to select which byte locations within the four-byte group are accessed during the data transfer. The asterisk following the abbreviated line designation denotes that these lines are "active low" (i.e., considered "active" when driven low). Using these four lines, a master can access one, two, three or four-byte locations simultaneously, depending upon the type of cycle initiated.

The DTB includes six address modifier lines which allow the master to pass additional binary information to the slave during a data transfer. Sixty-four possible modifier codes exist, which are classified into each of three categories: defined, reserved and user defined. User defined codes may be used for any purpose which the user deems appropriate. Typical uses of the user defined codes include page switching, memory protection, master or task identification, privileged access to resources and so forth.

Thirty-two data lines, D00 through D31, actually transfer data across the bus. The master may simultaneously access up to four byte locations. When the master has selected the byte locations to be accessed, it can transfer binary data between itself and those locations over the data bus.

The DTB includes six control lines: address strobe (AS*), data strobe zero (DS0*), data strobe one (DS1*), bus error (BERR*), data transfer acknowledge (DTACK*), and read/write (WRITE*). The VME standard requires that the control lines be considered "active" when driven low.

A falling edge on the AS* line informs all slave modules that the broadcasted address is stable and can be captured.

DS0* and DS1*, in addition to their function in selecting byte locations for data transfer, also serve control functions. On WRITE cycles, the first falling edge of the data strobe indicates that the master has placed valid data on the data bus. On READ cycles, the first rising edge tells the slave when it can remove valid data from the DTB.

A slave will drive DTACK* low to indicate that it has successfully received the data on a WRITE cycle. On a READ cycle, the slave drives DTACK* low to indicate that it has placed data on the DTB.

The BERR* line is an open-collector signal driven low by the slave or the bus timer to indicate to the master that the data transfer was unsuccessful. For example, if a master tries to write to a location which contains Read-Only memory, the responding slave might drive BERR* low. If the master tries to access a location that is not provided by any slave, the bus timer would drive BERR* low after waiting a specified period of time.

WRITE* is a level significant line strobed by the leading edge of the first data strobe. It is used by the master to indicate the direction of data transfer operations. When WRITE* is driven low, the data transfer direction is from the master to the slave. When WRITE* is driven high, the data transfer direction is from the slave to the master.

The VMEbus standard sets forth a handshake which requires four separate propagations across the VMEbus. The master asserts DS0* and DS1* to initiate the data transfer cycle. The slave, in response to the master's assertion of DS0* and DS1*, asserts DTACK*. In response to the assertion of DTACK*, the master deasserts DS0* and DS1*. The slave, in response, deasserts DTACK* to complete the handshake. Each four of these propagations is required to accomplish the handshake.

The maximum transfer rate across a typical VMEbus is generally in the range of 20 to 30 megabytes per second. However, in situations where a great deal of data must be transferred very quickly from one device on the VMEbus to another device on the VMEbus or a large number of data transfers need to be made, this transfer rate can oftentimes be slow enough to result in processing delays. Accordingly, in order to maximize data transfer and processing efficiency, the transfer rate of data across the VME backplane bus should be increased.

A significant limitation to increasing the data transfer speed of the VMEbus, in addition to the limitations described above, is the ability to provide data to the bus at rates in excess of 20 to 30 megabytes per second. Typically, a conventional microprocessor, such as a Motorola 68020, and a standard peripheral DMA controller are used to drive a data burst onto the VMEbus. However, regardless of the actual peak data burst speed of the DMA controller, the overhead that must be performed both during and between data burst transfers by the microprocessor becomes a significant limiting factor. Consequently, while peak transfer rates of 40 megabytes per second are sometimes claimed, the actual average transfer rates for extended amounts of data is often much less than even 20 megabytes per second.

SUMMARY OF THE INVENTION

The present invention is directed to a direct memory access control system for providing for the high speed burst transfer of data blocks from a data source to a data destination. The system includes a first processor for identifying one or more data blocks for transfer from a data source to a data destination and prepares a data structure defining the data transfer required for the transfer of the data block. A second processor, responsive to an enable signal, autonomously generates addressing signals and data transfer signals to effect the transfer of a data block from the data source to the data destination. Upon completion of a transfer, the second processor generates a transfer done signal. A third processor, responsive to the first processor, is provided to initialize the second processor for the transfer of a data block determined by the defining data structure as prepared by the first processor. The third processor, in response to the transfer done signal, initializes the second processor and provides the enable signal autonomously with respect to the first processor.

The present invention thus provides an apparatus for efficiently and rapidly transferring data bursts particularly including transfers across a high speed data bus.

Another advantage of the present invention is that it is able to minimize the delay between the transfer completion of one data burst and the beginning of the transfer of a subsequent data burst transfer.

A further advantage of the present invention is that it is capable of efficiently transferring data from any selected one of a plurality of data sources to any other one of a plurality of data destinations. The selection of a data source and preparation for a corresponding data burst transfer will be optimally performed concurrent with the transfer of the immediately prior selected data burst. Further, the plurality of data sources and data destinations can be intersecting sets.

Yet another advantage of the present invention is that each of the processors execute substantially autonomously from one another, allowing the greatest amount of concurrent processing to occur.

BRIEF DESCRIPTION OF THE DRAWINGS

These and other attendant advantages and features of the present invention will become apparent and readily appreciated as the same becomes better understood by reference to the following detailed description when considered in conjunction with the accompanying drawings, in which like reference numerals indicate like parts throughout the figures thereof, and wherein:

FIG. 10A illustrates a data transfer cycle which could be inserted in the location of box 1000 shown in FIG. 10.

DESCRIPTION OF THE PREFERRED EMBODIMENTS

I. System Overview

Figure 1:
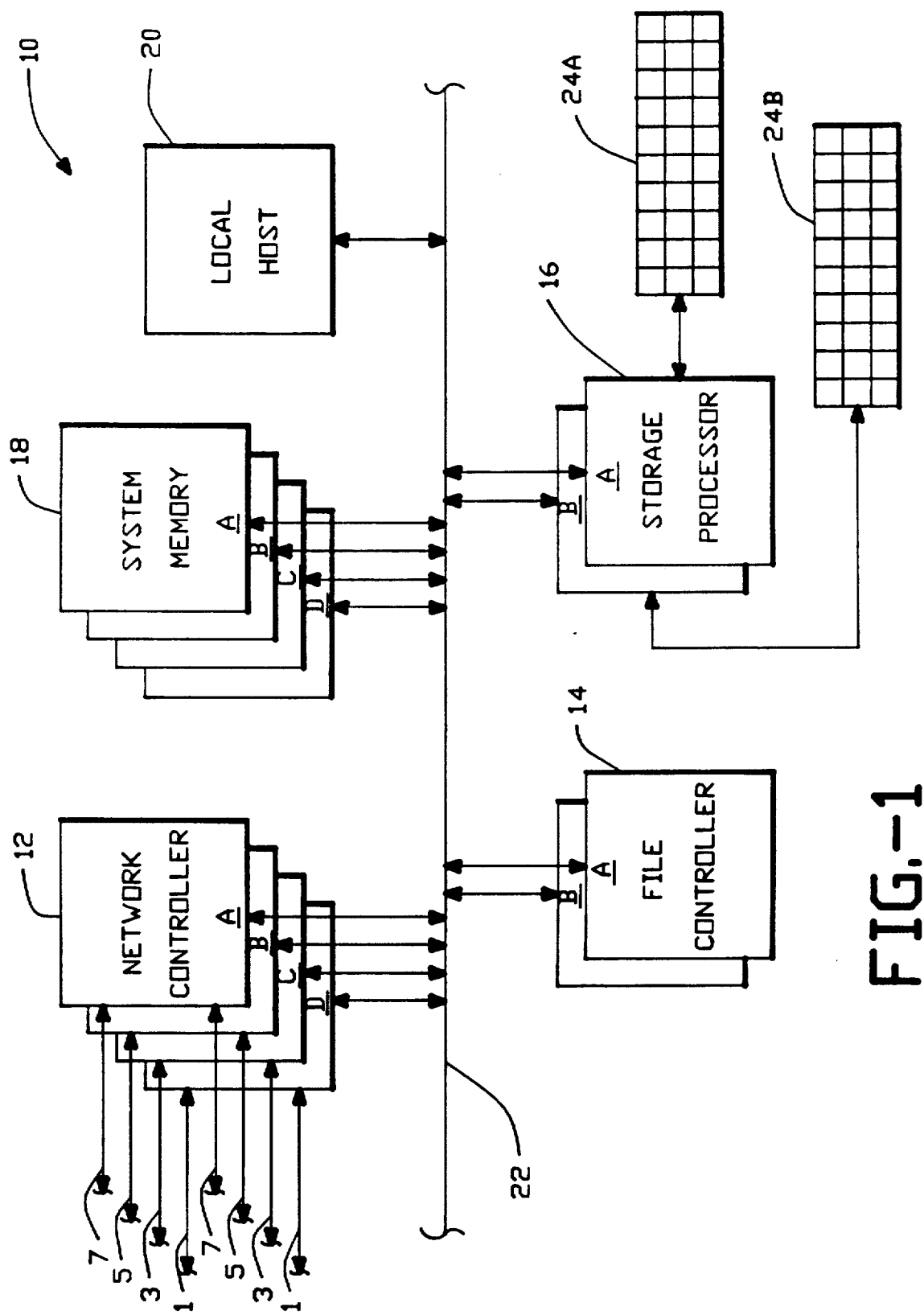
FIG. 1 is a block diagram representing the preferred embodiment of the hardware support for the present invention.

A block diagram representing the preferred embodiment of the hardware support for the present invention, generally indicated by the reference numeral 10, is provided in FIG. 1. The architecture of the preferred hardware system 10 is described in the above-identified related application entitled PARALLEL I/O NETWORK FILE SERVER ARCHITECTURE which application is expressly incorporated by reference.

The hardware components of the system 10 include multiple instances of network controllers 12, file system controllers 14, and mass storage processors 16 interconnected by a high-bandwidth backplane bus 22. Each of these controllers 12, 14, 16 preferably include a high performance processor and local program store, thereby minimizing their need to access the bus 22. Rather, bus 22 accesses by the controllers 12, 14, 16 are substantially limited to transfer accesses as required to transfer control information and client workstation data between the controllers 12, 14, 16 system memory 18, and a local host processor 20, when necessary.

The illustrated system 10 configuration includes four network controllers 12A-D two file controllers 14A-B two mass storage processors 16A-B a bank of four system memory cards 18A-D and a local host processor 20 coupled to the backplane bus 22. Each network controller (NC) 12 preferably includes two independent ethernet network connections, shown as the network pairs 1, 3, 5 and 7, controlled by a Motorola 68020 processor. Each of the network connections directly supports the ten megabit per second data rate specified for a conventional individual Ethernet network connection. The preferred hardware embodiment of the present invention thus realizes a combined maximum data throughput potential of 80 megabits per second.

The file controllers (FC) 14, intended to operate primarily as specialized compute engines, each include a high-performance Motorola 68020 based microprocessor system, two megabytes of local program memory and a smaller half-megabyte high-speed data store.

The mass storage processors (SP) 16 function as intelligent small computer system interface (SCSI) controllers. Each includes a Motorola 68020 based microprocessor system, a local program and data memory, and an array of ten parallel SCSI channels. Drive arrays 24A-B are coupled to the storage processors 16A-15B to provide mass storage. Preferably, the drive arrays 24A-B are ten unit wide arrays of SCSI storage devices and from one to three units deep uniformly. In the preferred embodiment of the present invention using conventional 768 megabyte 5¼-inch hard disk drives for each unit of the arrays 24A-B. Thus, each drive array level achieves a storage capacity of approximately 6 gigabytes, with each storage processor readily supporting 18 gigabytes, and a system 10 capable realizing a total combined data storage capacity of 36 gigabytes.

The local host processor 20, in the preferred embodiments of the present invention, is a Sun 3/40 central processor card, model Sun 3E120, manufactured and distributed by Sun Microsystems, Inc.

Finally, the system memory cards 18 each provide 32 megabytes of 32-bit memory for shared use within the computer system 10. The memory is logically visible to and addressable by each of the processors of the system 10.

A VMEbus 22 is used in the preferred embodiments of the present invention to interconnect the network controllers 12, file controllers 14, storage processor 16, system memory 18, and local host 20. The hardware control logic for controlling the VMEbus 22, as at least implemented on the network controller 12 and storage processor 16, has been enhanced to support the bus master fast transfer protocol of the present invention. The system memory 18 also implements the modified slave VMEbus control logic, also in accordance with the present invention, to allow the system memory 18 to act as the data transfer data source or destination for the network controller 12 and storage processors 16.

It should be understood that, while the system 10 configuration represents the initially preferred maximum hardware configuration, the present invention is not limited to the preferred number or type of controllers or the preferred number, size and type of disk drives.

II. Enhanced VMEbus Overview

Figure 2:
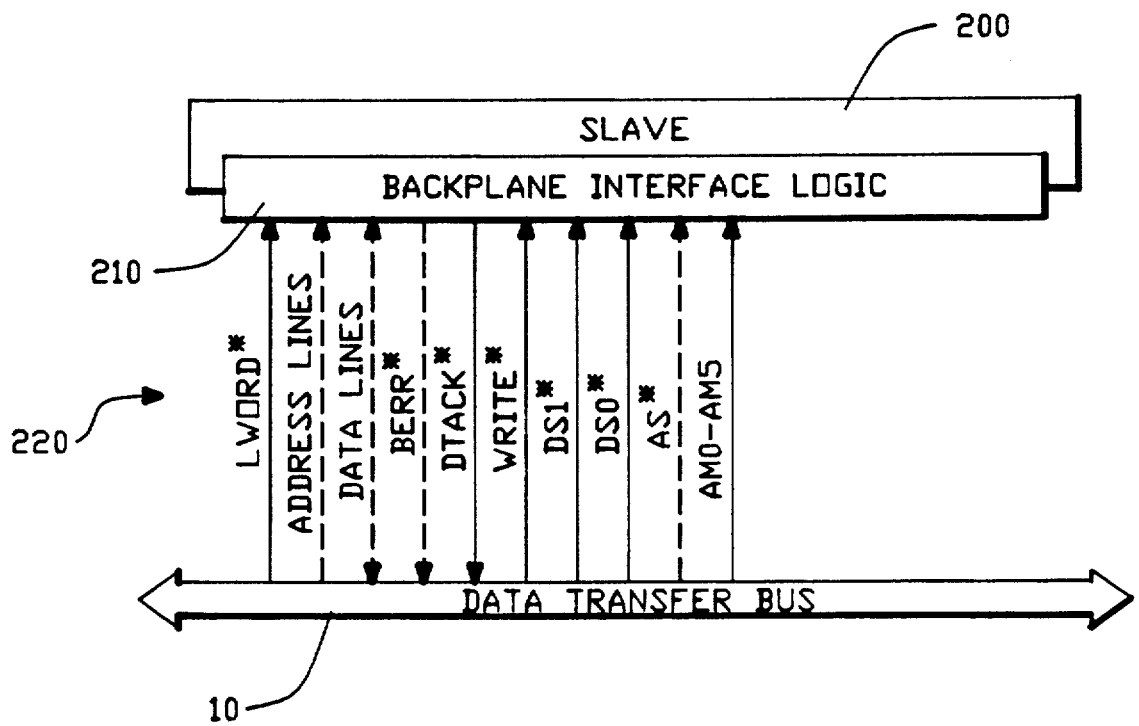
FIG. 2 is a block diagram illustrating the principal signal lines logically connecting the data transfer bus to a master functional unit, as required by the VMEbus standard.
Figure 3:
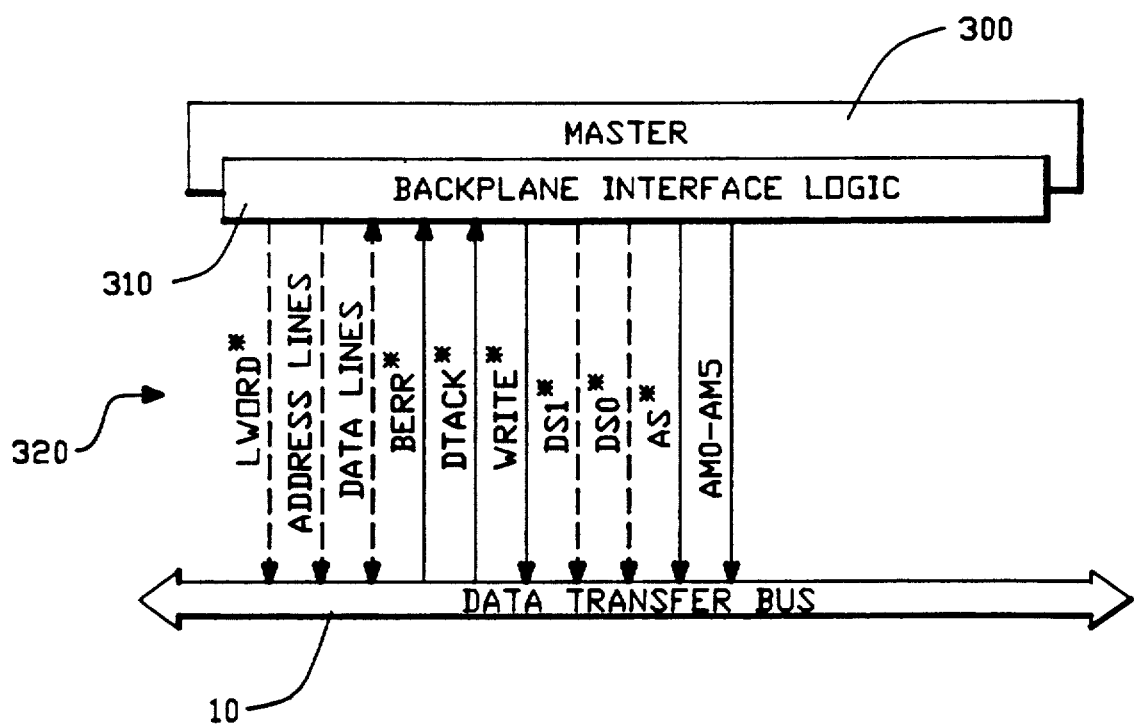
FIG. 3 is a block diagram illustrating the principal signal lines logically connecting the data transfer bus to a slave functional unit, as required by the VMEbus standard.

FIGS. 2 and 3 are, respectively, block diagrams of typical master and slave functional units (respectively hereinafter "master" and "slave"). The signal lines interconnecting the master and slave across the data transfer bus (DTB), as shown in FIGS. 2 and 3, are the following:

| | |
|---|---|
| A01-A15 | ADDRESS bus (bits 1-15)- Three-state driven address lines that are used to broadcast a short, standard, or extended address. |
| A16-A23 | ADDRESS bus (bits 16-23)- Three-state driven address lines that are used in conjunction with A01-A15 to broadcast a standard or extended address. |
| A24-A31 | ADDRESS bus (bits 24-31)- Three-state driven address lines that are used in conjunction with A01-A23 to broadcast an extended address. |
| AM0-AM5 | ADDRESS MODIFIER (bits 0-5)- Three-state driven lines that are used to broadcast information such as address size, cycle type, and/or MASTER identification. |
| AS* | ADDRESS STROBE - A three-state driven signal that indicates when a valid address has been placed on the address bus. |
| BERR* | BUS ERROR - An open-collector driven signal generated by a SLAVE or BUS TIMER. This |

| | -continued |
|---|---|
| | signal indicates to the MASTER that the data transfer was not completed. |
| D00—D31 | DATA BUS - Three-state driven bidirectional data lines used to transfer data between MASTERS and SLAVES. |
| DS0*, DS1* | DATA STROBE ZERO, ONE - Three-state driven signals used in conjunction with LWORD and A01 to indicate how many data bytes are being transferred (1, 2, 3, or 4). During a write cycle, the falling edge of the first data strobe (conventionally DS0* & DS1*) indicates that valid data is available on the data bus. On a read cycle, the rising edge of the first data strobe indicates that data has been accepted from the data bus. |
| DTACK* | DATA TRANSFER ACKNOWLEDGE - A three-state driven signal generated by a SLAVE. The falling edge of this signal indicates that valid data is available on the data bus during a read cycle, or that data has been accepted from the data bus during a write cycle. The rising edge indicates when the SLAVE has released the data bus at the end of a READ CYCLE. |
| LWORD* | LONGWORD - A three-state driven signal used in conjunction with DS0*, DS1*, and A01 to select which byte location(s) within the 4-byte group are accessed during the data transfer. |
| WRITE* | WRITE - A three-state driven signal generated by the MASTER to indicate whether the data transfer cycle is a read or write. A high level indicates a read operation; a low level indicates a write operation. |

As shown in FIG. 2, the slave functional module 200 is logically connected to backplane interface logic 210. The backplane interface logic 210 is connected to the data transfer bus 10 by signal lines 220. The signal flow direction of the signal lines 220 is indicated by the direction of the respective arrows. The DTACK* signal line originates with the slave and is driven by a conventional 64 mA three-state driver. The data lines are, of course, bidirectional, as shown in FIG. 2.

As shown in FIG. 3, the master functional module 300 is logically connected to backplane interface logic 310. The backplane interface logic 310 is connected to the data transfer bus 10 by signal lines 320. The signal flow direction of the signal lines 320 is indicated by the direction of the respective arrows. The DS0*, DS1*, AS* and AM0 through AM5 signal lines originate with the master. The data lines, D00 through D31, are, of course, bidirectional, as shown in FIG. 3.

III. Enhanced VMEbus Fast Transfer Protocol

The present invention increases the data transfer rate across the VMEbus by reducing the number of bus propagations required to accomplish handshaking and data transfer.

Figure 4A:
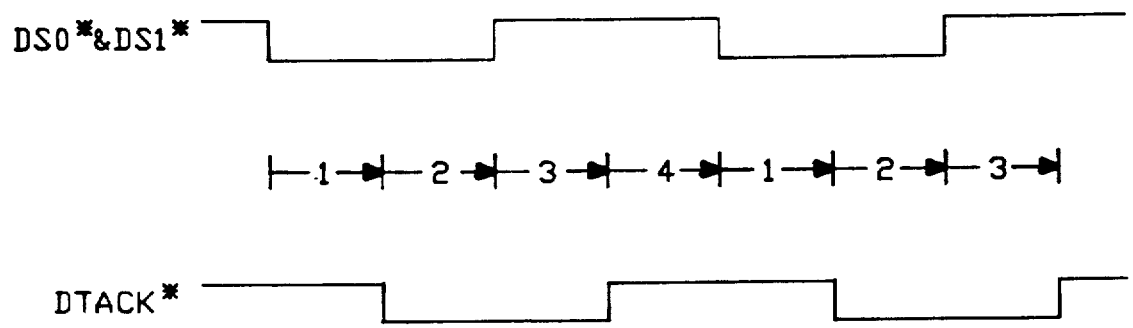
FIG. 4A is a timing diagram illustrating the conventional VMEbus standard handshaking protocol.

FIG. 4A illustrates the conventional handshaking protocol defined by the VMEbus standard. Four bus propagations are required to accomplish a handshake using the conventional VMEbus handshaking protocol. A master will initiate a data transfer over the DTB by asserting DS0* and DS1*, shown as propagation in FIG. 4A. The addressed slave then asserts DTACK*, shown as propagation 2 in FIG. 4A. The master, upon receiving the assertion of DTACK* driven by the slave, deasserts DS0* and DS1*, shown as propagation 3 in FIG. 4A. The slave, upon receiving deassertion of DS0* and DS1*, deasserts DTACK*, shown as propagation 4 in FIG. 4A. Upon the deassertion of DTACK by the slave, the handshake is then completed.

Figure 4B:
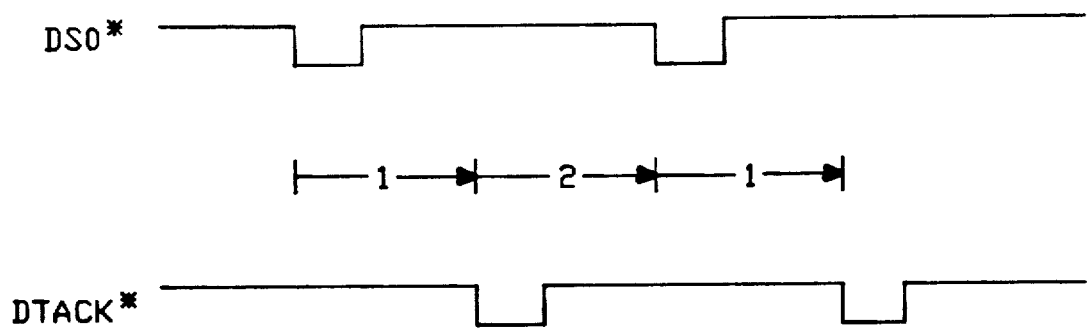
FIG. 4B is a timing diagram illustrating the fast transfer mode handshake.

FIG. 4B is a timing diagram illustrating the fast transfer mode handshake protocol. Only two bus propagations are used to accomplish a handshake. At the initiation of a data transfer cycle, the master will assert and deassert DS0* in the form of a pulse of a given duration in the manner shown as propagation 1 in FIG. 4B. The deassertion of DS0* is accomplished without regard as to whether a response has been received from the slave. Hence, the DS0* signal is wholly decoupled from the DTACK* signal.

The master must then wait for an acknowledgement from the slave. Subsequent pulsing of DS0* cannot occur until a responsive DTACK* signal is received from the slave. Upon receiving the slave's assertion of DTACK*, shown as propagation 2 in FIG. 4B, the master can then immediately reassert data strobe, if so desired. The fast transfer mode protocol of the present invention does not require the master to wait for the deassertion of DTACK* by the slave as a condition precedent to the subsequent assertions of DS0*. In the fast transfer mode, only the leading edge (i.e., the assertion) of a signal is significant. Thus, the deassertion of either DS0* or DTACK* is completely irrelevant for completion of a handshake.

It should be noted that the fast transfer protocol of the present invention does not employ the DS1* line for data strobe purposes. The use of both DS0* and DS1* would be undesirable in the present context. Because DS0* and DS1* are driven by different drivers, skew between the signals is a very common problem. Skew between DS0* and DS1* results in delay of the assertion of the data strobe condition required to signal a data transfer. Accordingly, under the present invention, the DS1* line is not used in the handshake process. Skew problems are eliminated by referencing on DS0* for data strobe purposes under the fast transfer mode protocol of the present invention.

The fast transfer mode protocol may be characterized as pseudo-synchronous as it includes both synchronous and asynchronous aspects. The fast transfer mode protocol is synchronous in character due to the fact that DS0* is asserted and deasserted without regard to a response from the slave. The asynchronous aspect of the fast transfer mode protocol is attributable to the fact that the master may not subsequently assert DS0* until a response to the prior strobe is received from the slave. Consequently, because the present invention includes both synchronous and asynchronous components, it is most accurately classified as "pseudo-synchronous."

Figure 5A:
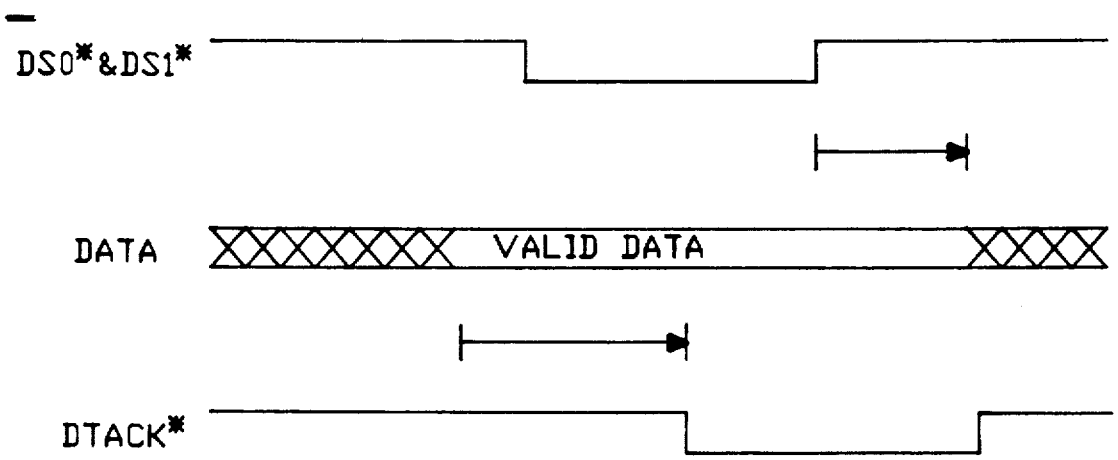
FIG. 5 is timing diagram illustrating the standard VMEbus protocol for data referencing during a BLOCK WRITE cycle.
FIG. 5B is timing diagram illustrating the fast transfer protocol of the present invention for data referencing during a BLOCK WRITE cycle.

FIG. 5A is a timing diagram illustrating the standard VMEbus protocol for data referencing during a BLOCK WRITE cycle. In a standard VMEbus BLOCK WRITE operation, the data to be transferred is broadcast, as shown in FIG. 5A, and the master asserts DS0* and DS1*. The slave receives the data and asserts DTACK*. Under the standard VMEbus protocol, valid data is guaranteed to be broadcast to the slave for a known period of time after the assertion of DTACK* by the slave. The master then deasserts DS0* and DS1*, although valid data continues to be broadcast. The BLOCK WRITE cycle is completed upon deassertion of DTACK* by the slave.

Figure 5B:
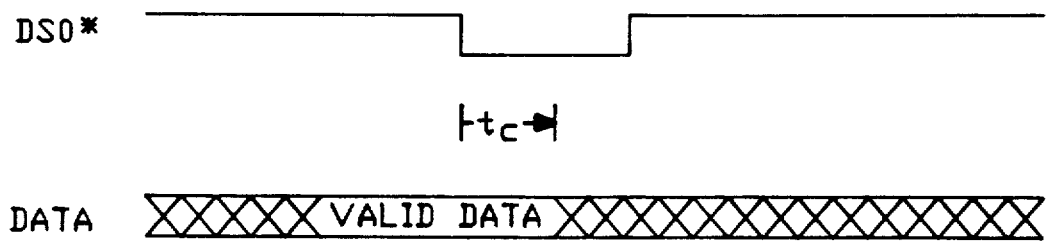

FIG. 5B is a timing diagram illustrating the fast transfer protocol of the present invention for data referencing during a BLOCK WRITE cycle. The transfer of data during a BLOCK WRITE cycle is referenced only to DS0*, as shown in FIG. 5B. The master broadcasts valid data to the slave. The master then asserts DS0 to the slave, as shown in FIG. 5B. The slave is given a predetermined period of time, $t_c$ in FIG. 5B, after the assertion of DS0* in which to capture the data. Hence, slave modules must be prepared to capture data at any time, as DTACK* is not referenced during the transfer cycle.

Figure 6A:
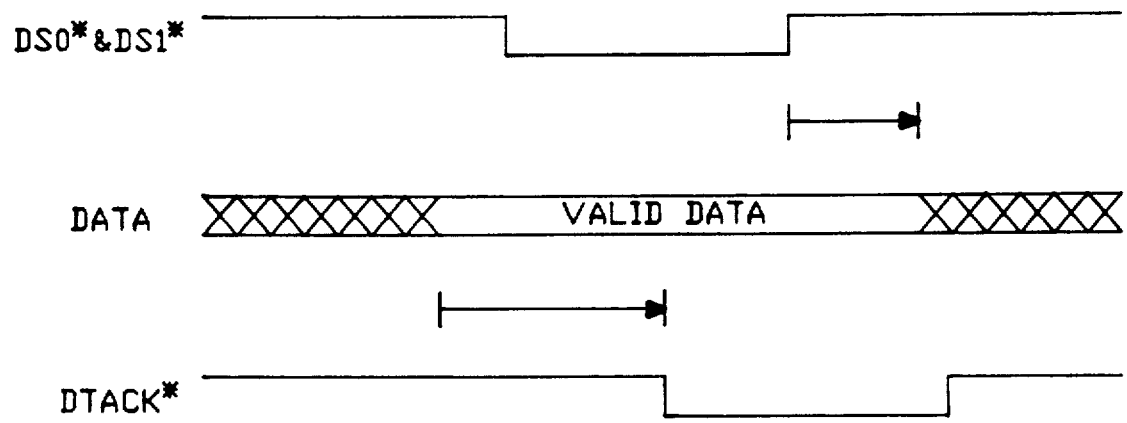
FIG. 6A is timing diagram illustrating the standard VMEbus protocol for data referencing during a BLOCK READ cycle.

FIG. 6A is timing diagram illustrating the standard VMEbus protocol for data referencing during a BLOCK READ cycle. In a standard VMEbus BLOCK READ operation, the master asserts DS0* and DS1*, as shown in FIG. 6A. The slave, in response to the assertion of DS0* and DS1*, broadcasts the data to be transferred across the bus and asserts DTACK*. Valid data is guaranteed to be broadcast to the master for a given period of time after the assertion of DTACK* by the slave. The master then deasserts DS0* and DS1*, although valid data continues to be broadcast. The BLOCK READ cycle is completed upon deassertion of DTACK* by the slave.

Figure 6B:
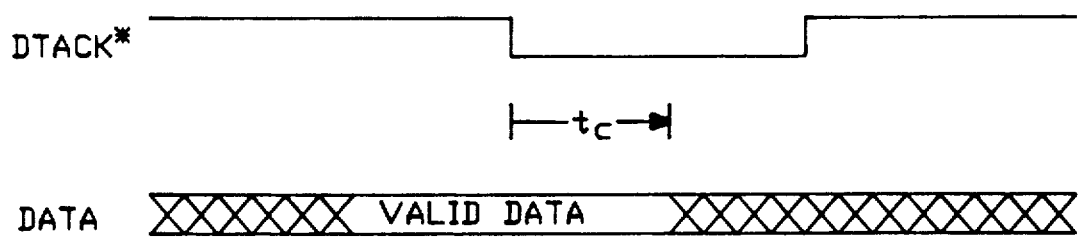
FIG. 6B is timing diagram illustrating the fast transfer protocol of the present invention for data referencing during a BLOCK READ cycle.

FIG. 6B is a timing diagram illustrating the fast transfer protocol of the present invention for data referencing during a BLOCK READ cycle. The transfer of data during a BLOCK READ cycle is referenced only to DTACK*, as shown in FIG. 6B. The master briefly asserts DS0* as shown in FIGS. 4B. The slave broadcasts data to the master and then asserts DTACK*, as shown in FIG. 6B. Under the fast transfer protocol, the master is given a predetermined period of time, $t_c$ in FIG. 6B, after the assertion of DTACK, in which to capture the data. Hence, master modules must be prepared to capture data at any time as DS0 is not referenced during the transfer cycle.

Figure 7A:
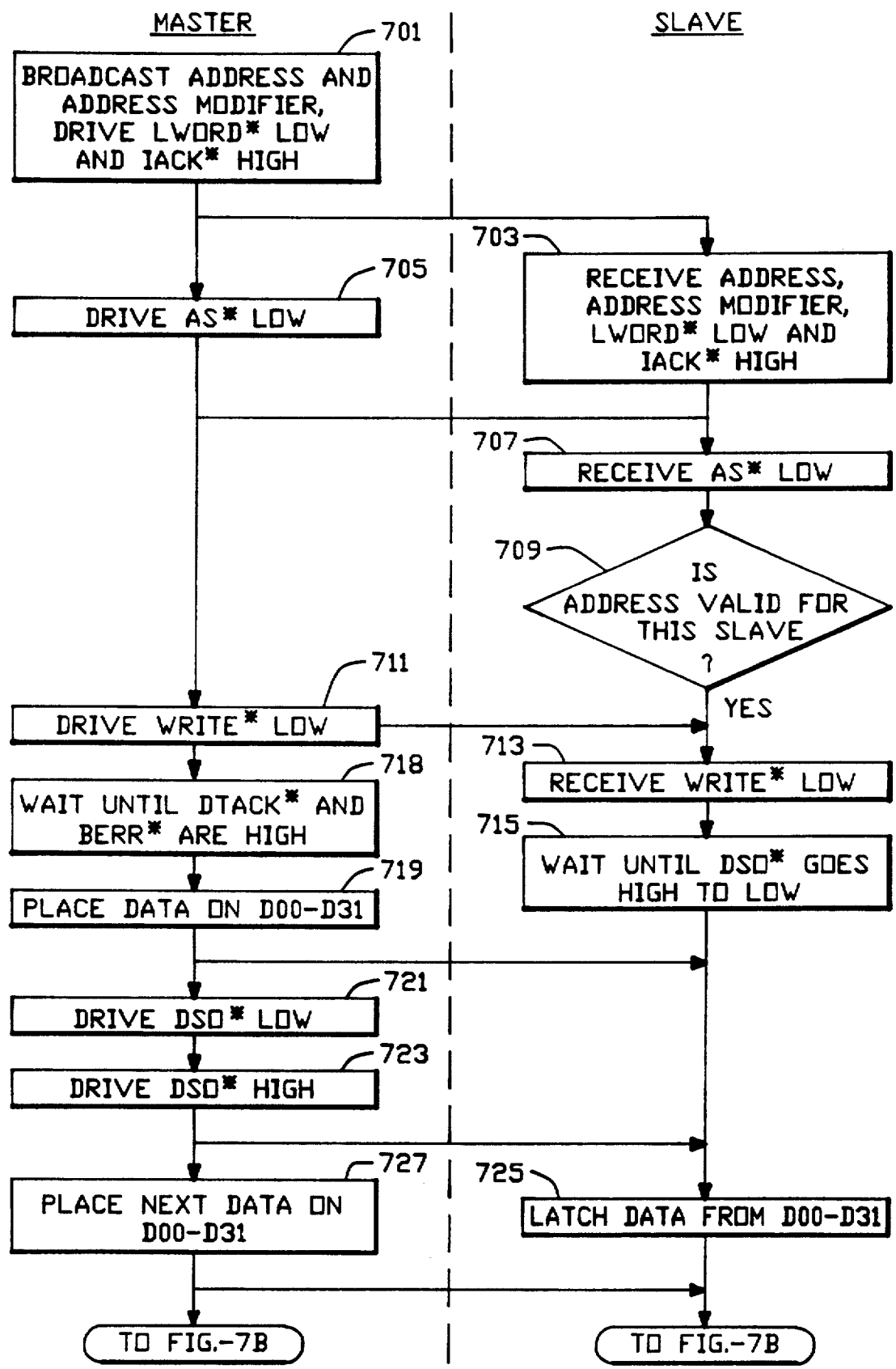
FIG. 7A is a flowchart illustrating the operation of the fast transfer protocol BLOCK WRITE cycle.
Figure 7B:
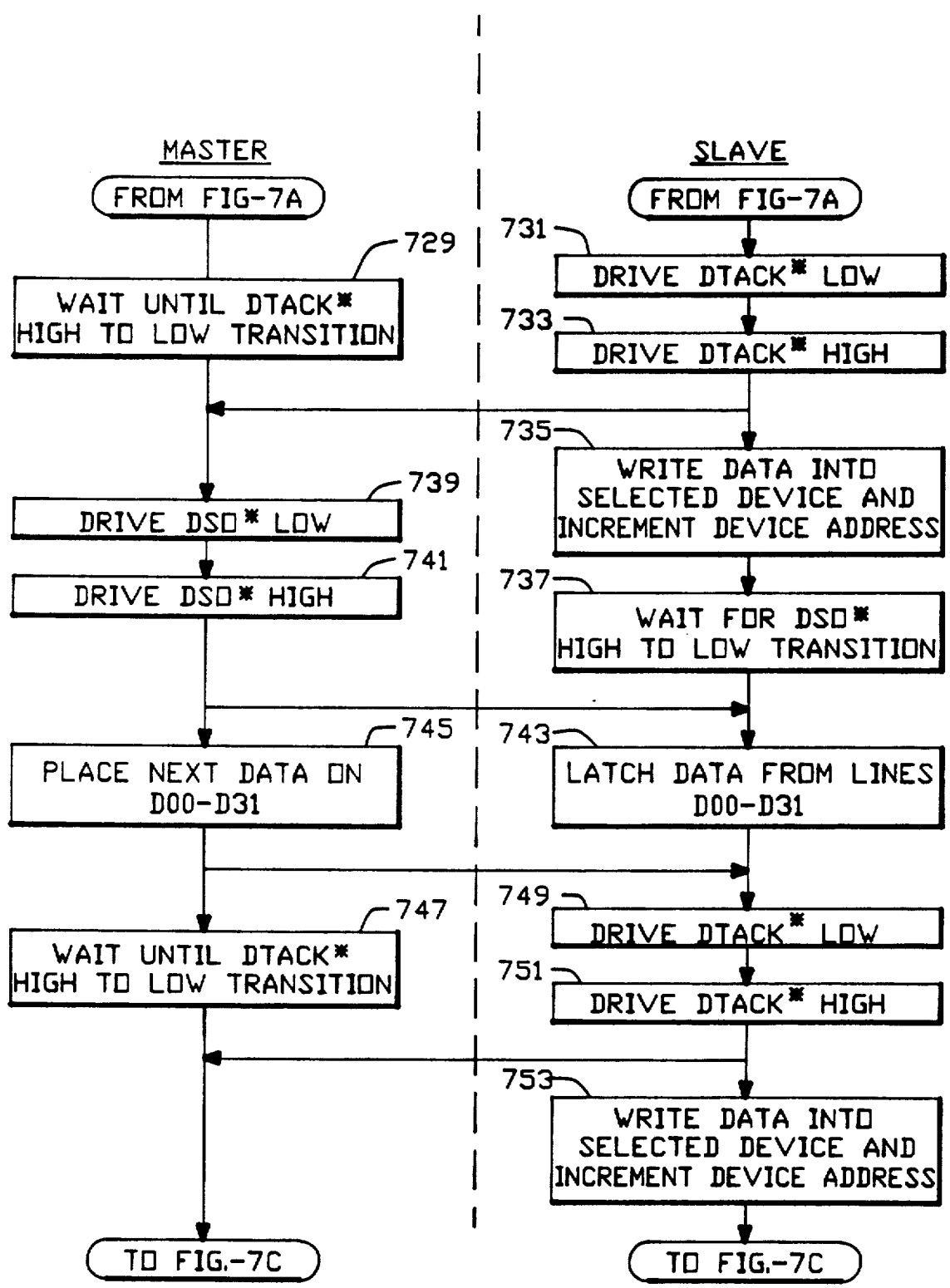
FIG. 7B is a continuation of the flowchart shown in FIG. 7A.
Figure 7C:
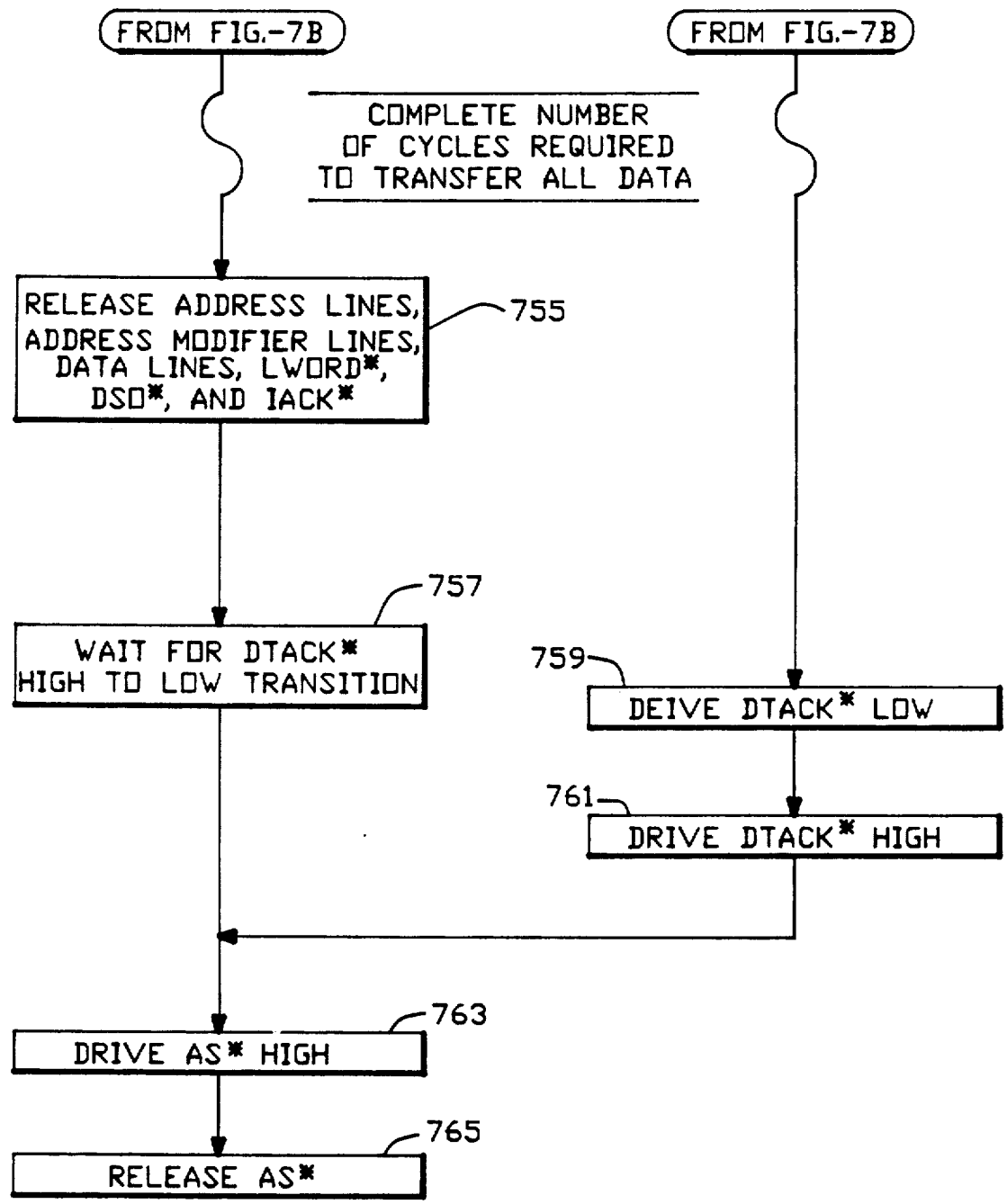
FIG. 7C is a continuation of the flowchart shown in FIG. 7B.

FIG. 7, parts A through C, is a flowchart illustrating the operations involved in accomplishing the fast transfer protocol BLOCK WRITE cycle of the present invention. To initiate a BLOCK WRITE cycle, the master broadcasts the memory address of the data to be transferred and the address modifier across the DTB bus. The master also drives interrupt acknowledge signal (IACK*) high and the LWORD* signal low 701. The IACK* signal is a standard VMEbus protocol signal used to acknowledge an interrupt request from the priority interrupt bus.

A special address modifier broadcast by the master indicates to the slave module that the fast transfer protocol will be used to accomplish the BLOCK WRITE. In one embodiment of the invention, the hexadecimal address modifier "IF," which is one of the user defined address modifiers under the VMEbus standard, is broadcast to the slave to indicate that the fast transfer protocol will be used. However, it should be understood that any of the user defined address modifiers might be designated as the fast transfer protocol address modifier.

It should also be noted that the starting memory address of the data to be transferred should reside on a 64-bit boundary and the size of block of data to be transferred should be a multiple of 64 bits. In order to remain in compliance with the VMEbus standard, the block must not cross a 256 byte boundary without performing a new address cycle.

The slave modules connected to the DTB receive the address and the address modifier broadcast by the master across the bus and receive LWORD* low and IACK* high 703. Shortly after broadcasting the address and address modifier 701, the master drives the AS* signal low 705. The slave modules receive the AS* low signal 707. Each slave individually determines whether it will participate in the data transfer by determining whether the broadcasted address is valid for the slave in question 709. If the address is not valid, the data transfer does not involve that particular slave and it ignores the remainder of the data transfer cycle.

The master drives WRITE* low to indicate that the transfer cycle about to occur is a WRITE operation 711. The slave receives the WRITE* low signal 713 and, knowing that the data transfer operation is a WRITE operation, awaits receipt of a high to low transition on the DS0* signal line 715. The master will wait until both DTACK* and BERR* are high 718, which indicates that the previous slave is no longer driving the DTB.

The master proceeds to place the first segment of the data to be transferred on data lines D00 through D31, 719. After placing data on D00 through D31, the master drives DS0* low 721 and, after a predetermined interval, drives DS0* high 723.

In response to the transition of DS0* from high to low, respectively 721 and 723, the slave latches the data being transmitted by the master over data lines D00 through D31, 725. It should be noted that the latching operation is responsive only to the DS0* signal as shown in FIG. 5B. In the fast transfer protocol of the present invention, DTACK* is not referenced for purposes of latching data placed on the data lines by the master. After the period $t_c$, as shown in FIG. 5B, the master places the next segment of the data to be transferred on data lines D00 through D31, 727, and awaits receipt of a DTACK* signal in the form of a high to low transition signal, 729 in FIG. 7B.

Referring to FIG. 7B, the slave then drives DTACK* low, 731, and, after a predetermined period of time, drives DTACK high, 733. The data latched by the slave, 725, is written to a device, which has been selected to store the data, 735. The slave also increments the device address, 735. The slave then waits for another transition of DS0* from high to low, 737.

To commence the transfer of the next segment of the block of data to be transferred, the master drives DS0* low, 739 and, after a predetermined period of time, drives DS0* high, 741. In response to the transition of DS0* from high to low, respectively 739 and 741, the slave latches the data being broadcast by the master over data lines D00 through D31, 743. The master places the next segment of the data to be transferred on data lines D00 through D31, 745, and awaits receipt of a DTACK* signal in the form of a high to low transition, 747.

The slave then drives DTACK* low, 749, and, after a predetermined period of time, drives DTACK* high, 751. The data latched by the slave, 743, is written to the device selected to store the data and the device address is incremented, 753. The slave waits for another transition of DS0* from high to low, 737.

The transfer of data will continue in the above-described manner until all of the data has been transferred from the master to the slave. After all of the data has been transferred, the master will release the address lines, address modifier lines, data lines, IACK* line, LWORD* line and DS0* line, 755. The master will then wait for receipt of a DTACK* high to low transition, 757. The slave will drive DTACK* low, 759 and, after a predetermined period of time, drive DTACK* high, 761. In response to the receipt of the DTACK* high to low transition, the master will drive AS* high, 763, and then release the AS* line, 765.

Figure 8A:
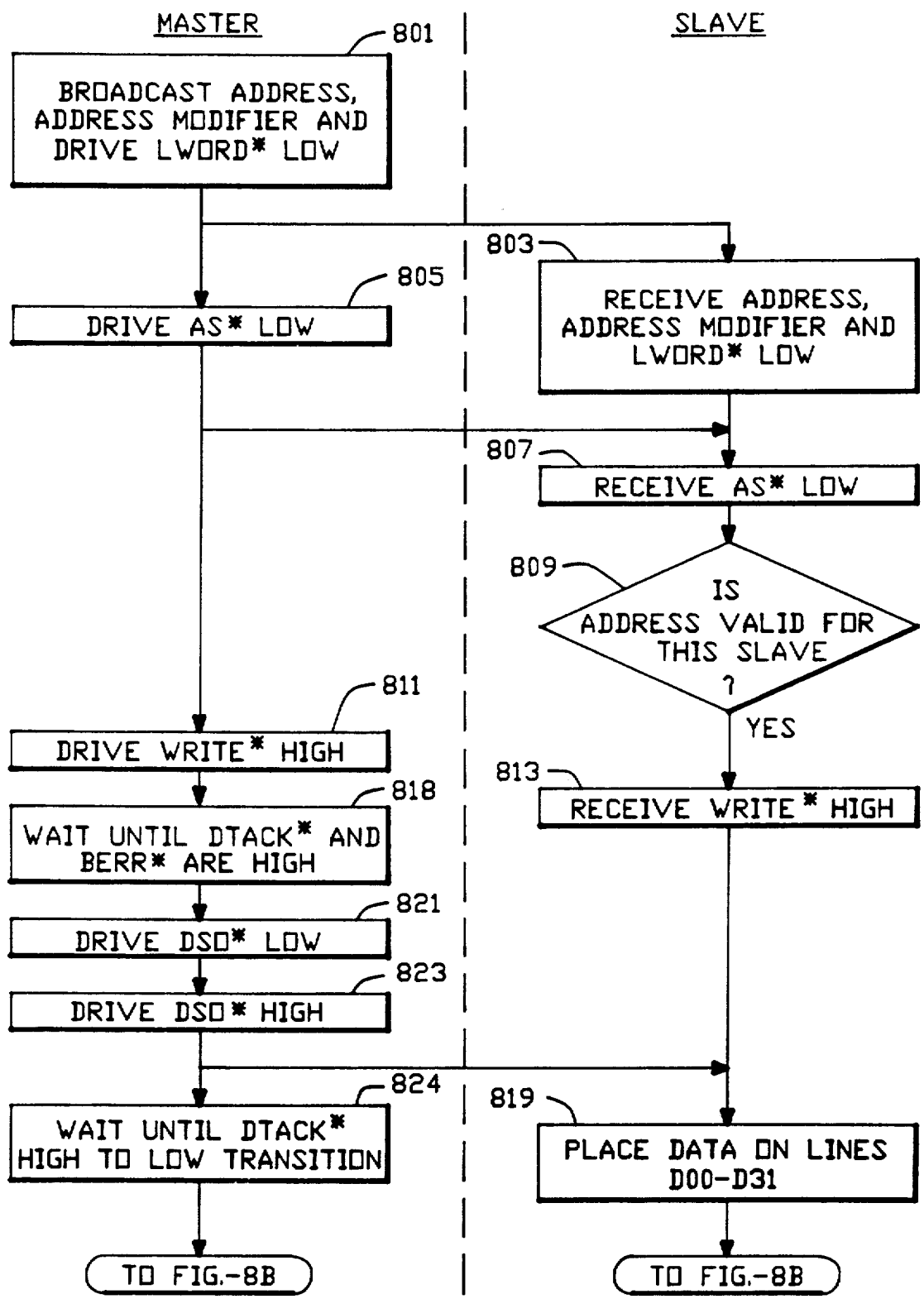
FIG. 8A is a flowchart illustrating the operation of the fast transfer protocol BLOCK READ cycle.

FIG. 8, parts A through C, is a flowchart illustrating the operations involved in accomplishing the fast transfer protocol BLOCK READ cycle of the present invention. To initiate a BLOCK READ cycle, the master broadcasts the memory address of the data to be transferred and the address modifier across the DTB bus, 801. The master drives the LWORD* signal low and the IACK* signal high, 801. As noted previously, a special address modifier indicates to the slave module that the fast transfer protocol will be used to accomplish the BLOCK READ.

The slave modules connected to the DTB receive the address and the address modifier broadcast by the master across the bus and receive LWORD* low and IACK* high, 803. Shortly after broadcasting the address and address modifier, 801, the master drives the AS* signal low, 805. The slave modules receive the AS* low signal, 807. Each slave individually determines whether it will participate in the data transfer by determining whether the broadcasted address is valid for the slave in question, 809. If the address is not valid, the data transfer does not involve that particular slave and it ignores the remainder of the data transfer cycle.

The master drives WRITE* high to indicate that the transfer cycle about to occur is a READ operation, 811. The slave receives the WRITE* high signal, 813, and, knowing that the data transfer operation is a READ operation, places the first segment of the data to be transferred on data lines D00 through D31, 819. The master will wait until both DTACK* and BERR* are high, 818, which indicates that the previous slave is no longer driving the DTB.

Figure 8B:
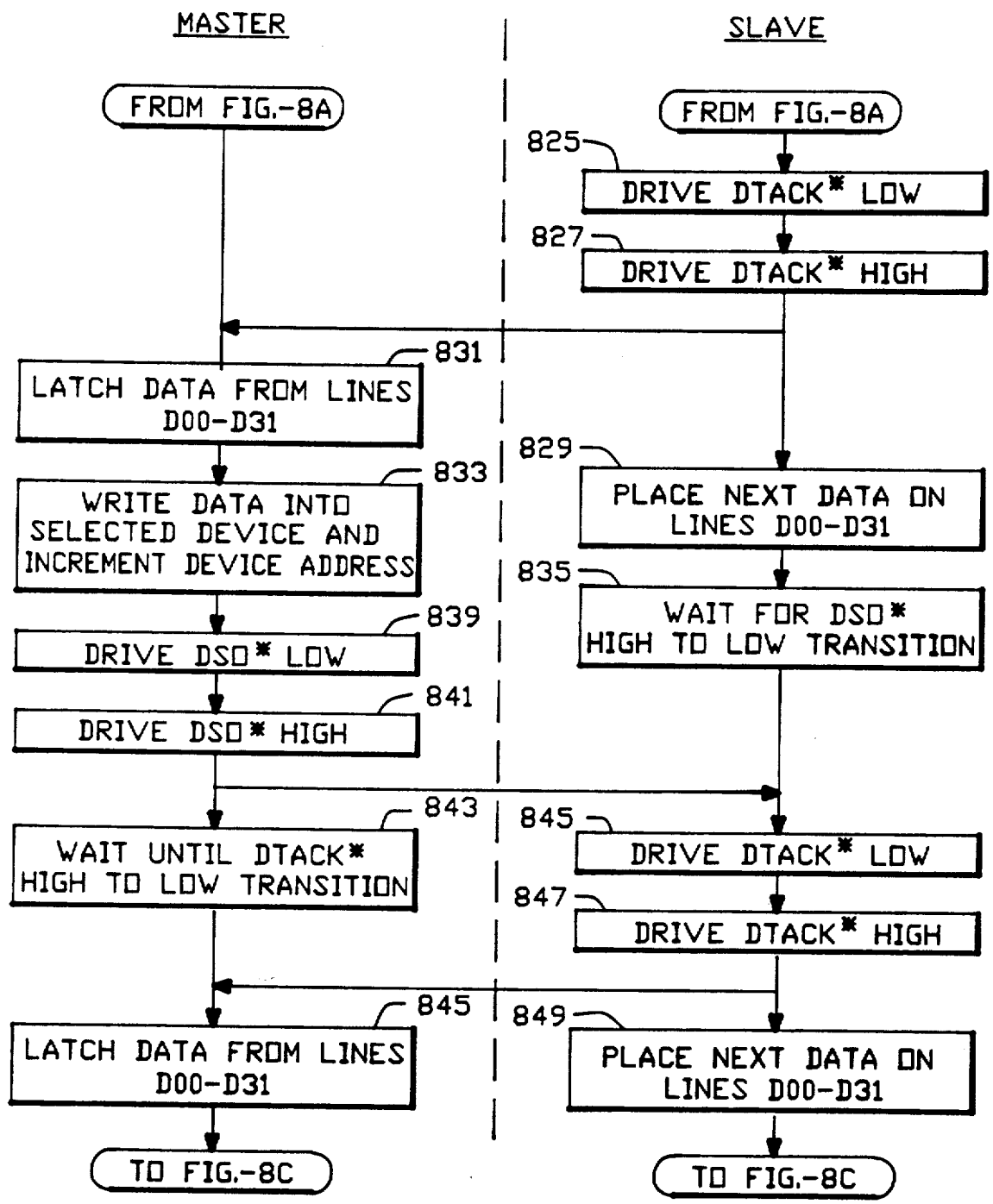
FIG. 8B is a continuation of the flowchart shown in FIG. 8A.
Figure 8C:
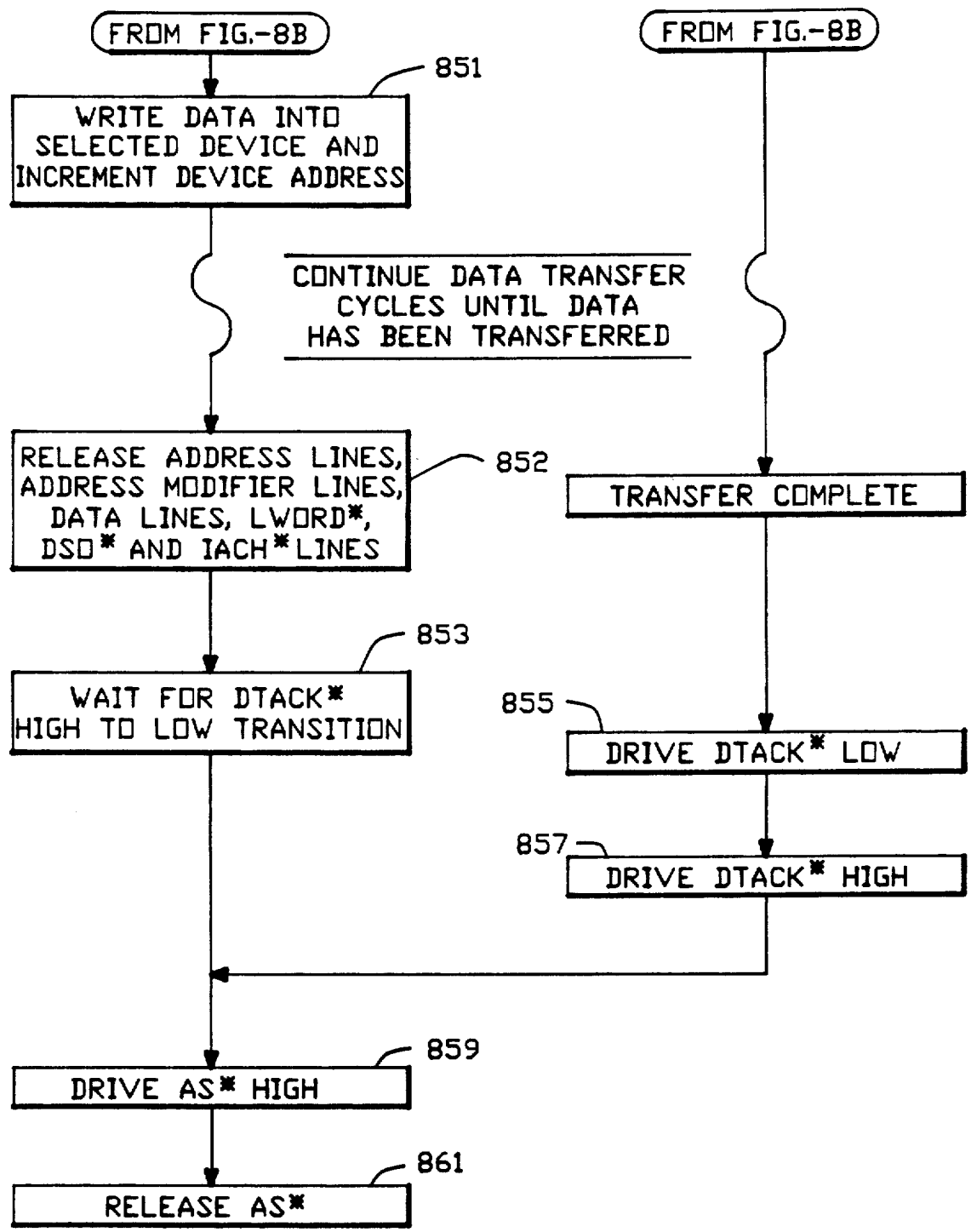
FIG. 8C is a continuation of the flowchart shown in FIG. 8B.

The master then drives DS0* low, 821, and, after a predetermined interval, drives DS0* high, 823. The master then awaits a high to low transition on the DTACK* signal line, 824. As shown in FIG. 8B, the slave then drives the DTACK* signal low, 825, and, after a predetermined period of time, drives the DTACK* signal high, 827.

In response to the transition of DTACK* from high to low, respectively 825 and 827, the master latches the data being transmitted by the slave over data lines D00 through D31, 831. It should be noted that the latching operation is responsive only to the DTACK* signal. In the fast transfer protocol of present invention, DS0* is not referenced for purposes of latching data placed on the data lines by the master. The data latched by the master, 831, is written to a device, which has been selected to store the data the device address is incremented, 833.

The slave places the next segment of the data to be transferred on data lines D00 through D31, 829, and then waits for another transition of DS0* from high to low, 837.

To commence the transfer of the next segment of the block of data to be transferred, the master drives DS0* low, 839, and, after a predetermined period of time, drives DS0* high, 841. The master then waits for the DTACK* line to transition from high to low, 843.

The slave drives DTACK* low, 845, and, after a predetermined period of time, drives DTACK* high, 847. In response to the transition of DTACK* from high to low, 845, the master latches the data being transmitted by the slave over data lines D00 through D31, 845. The data latched by the master is written to the device selected to store the data, 851 in FIG. 8C, and the device address is incremented. The slave places the next segment of the data to be transferred on data lines D00 through D31, 849.

The transfer of data will continue in the above-described manner until all of the data to be transferred from the slave to the master has been written into the device selected to store the data. After all of the data to be transferred has been written into the storage device, the master will release the address lines, address modifier lines, data lines, the IACK* line, the LWORD line and DS0* line, 852. The master will then wait for receipt of a DTACK* high to low transition, 853. The slave will drive DTACK* low, 855, and, after a predetermined period of time, drive DTACK* high, 857. In response to the receipt of the DTACK* high to low transition, the master will drive AS* high, 859, and release the AS* line, 861.

Figure 9:
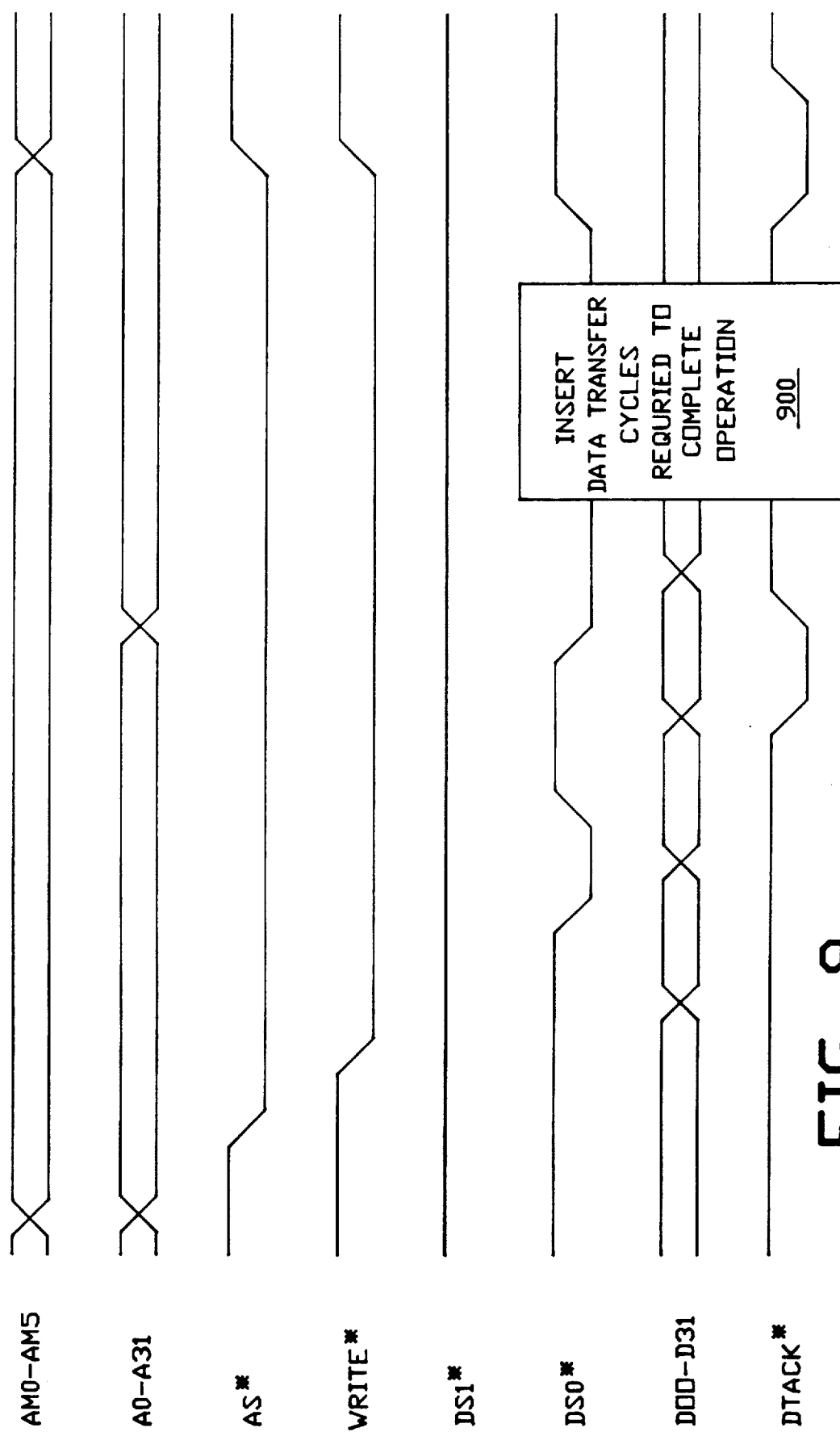
FIG. 9 is a timing diagram illustrating the data transfer timing associated with a fast transfer mode BLOCK WRITE operation.

FIG. 9 is a timing diagram illustrating the data transfer timing associated with a fast transfer mode BLOCK WRITE operation.

As shown in FIG. 9, the address of the location to which data is to be transferred is broadcast on lines A01 through A31. The address modifier, which would include the fast transfer mode address modifier code, is broadcast by the master on lines AM0 through AM5. After the address and address modifier have been set up on their respective lines, the master drives AS* low. The WRITE* line is driven low by the master to indicate, as noted previously, that the operation to follow is a WRITE operation.

Because the DS1* line is not used during a fast transfer mode operation, the line may or may not be asserted throughout the operation.

After driving the WRITE* line low, the master broadcasts the first segment of the data to be transferred on lines D00 through D31.

DS0* is driven low and the signal subsequently deasserted by being driven high, as shown in FIG. 9. The data being broadcast by the master as DS0* is driven low and is latched by the slave, in response to the DS0* signal being driven low. After DS0* is driven low, the master broadcasts the next segment of data to be transferred to the slave over lines D00 through D31, as shown in FIG. 9. The slave, in response to DS0* being driven low, subsequently acknowledges the data transfer by driving DTACK* low for a given period and then deasserting the signal by driving the DTACK* line high. As shown in FIG. 9, DS0* is not reasserted until the slave acknowledges the data transfer by driving the DTACK* line low.

As noted previously, the data transfer cycles will continue until all of the data to be transferred has been broadcast to the slave. The number of cycles required to complete the transfer would occur at box 900 in FIG. 9. Box 900 is merely exemplary and not drawn to a particular time scale.

Figure 9A:
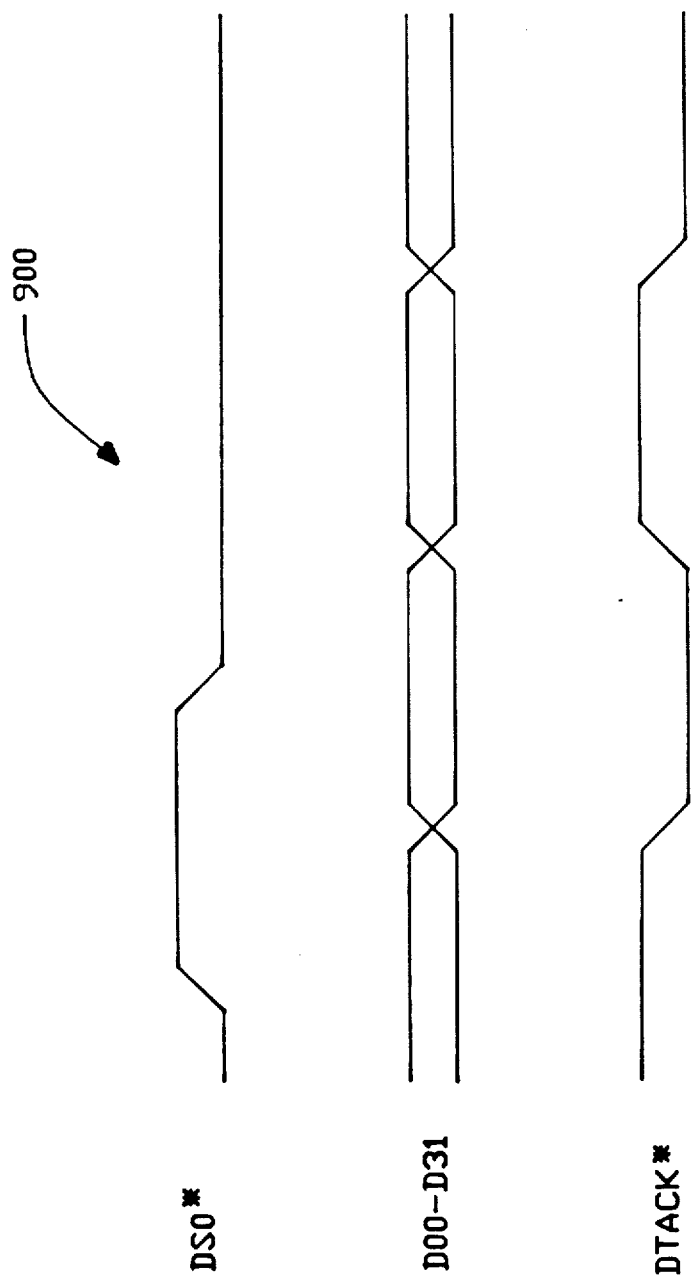
FIG. 9A illustrates a data transfer cycle which could be inserted in the location of box 900 shown in FIG. 9.

FIG. 9A illustrates a data transfer cycle which could be inserted in the location of box 900 in FIG. 9. As shown in FIG. 9A, DS0* is driven low. In response to the DS0* low signal, the slave latches the data broadcast at the time DS0* went low. The master broadcasts the next segment of the data to be transferred. The slave, acknowledging the data transfer, drives DTACK* low. This operation would continue until all data has been transferred.

Referring again to FIG. 9, after the data transfer operation has been completed, the slave drives DTACK* low. In response, the master deasserts AS* by driving the AS* line high. The master likewise releases the WRITE* line by driving the line high.

The duration of the respective DS0* and DTACK* signals can vary depending upon the application and the system being used. Likewise, the period between the assertion of DS0* and the assertion of DTACK* may also vary depending upon the application and the system being used. Obviously, the data transfer rate will be increased if the durations of the DS0* and DTACK* signals and the period between the assertion of DS0* and DTACK* are minimized.

Figure 10:
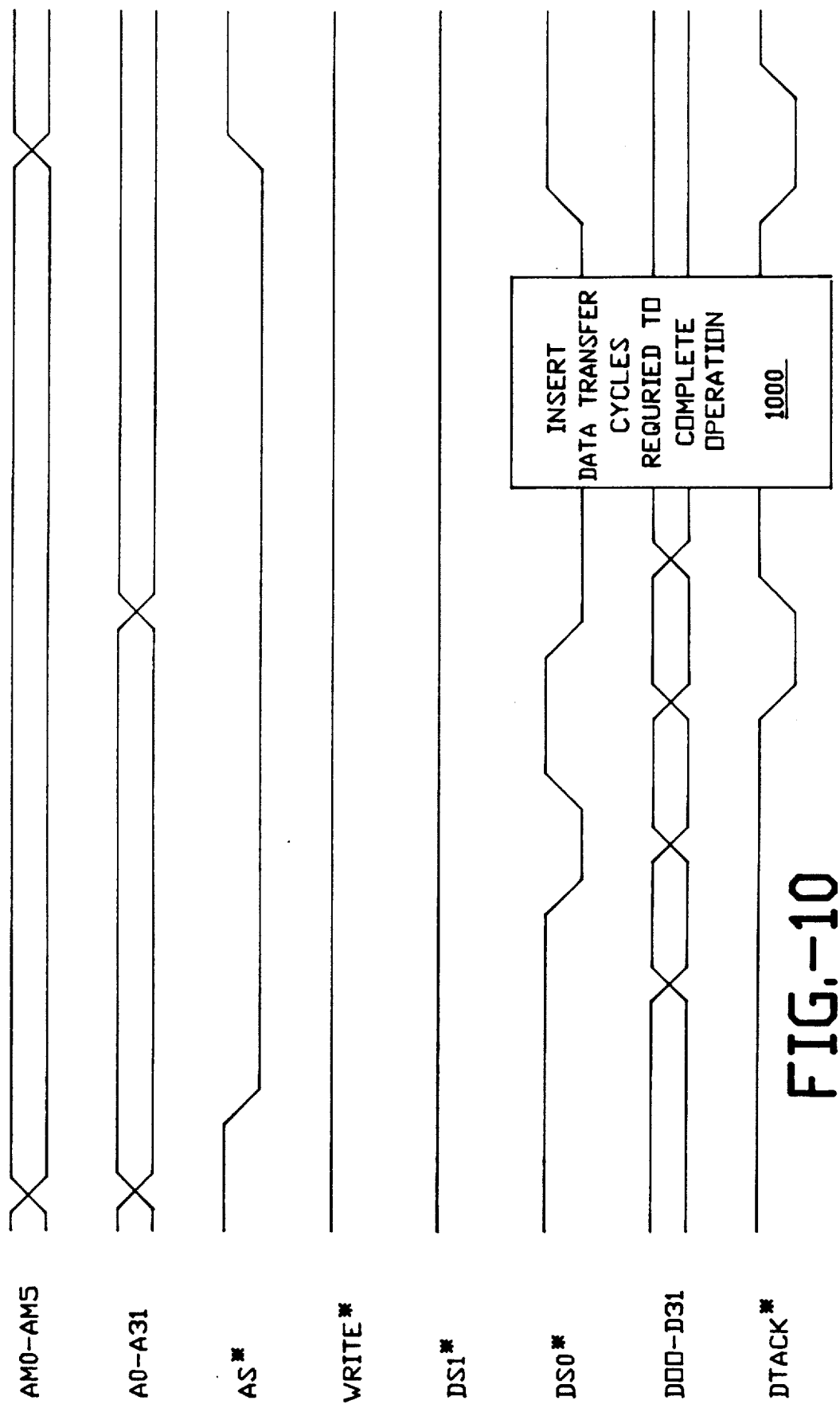
FIG. 10 is a timing diagram illustrating the data transfer timing associated with a fast transfer mode BLOCK READ operation.

FIG. 10 is a timing diagram illustrating the data transfer timing associated with a fast transfer mode BLOCK READ operation.

As shown in FIG. 10, the address of the location to which data is to be transferred is broadcast on lines A01 through A31. The address modifier, which would include the fast transfer mode address modifier code, is broadcast by the master on line AM0 through AM5. After the address and address modifier have been set up on their respective lines, the master drives AS* low. The WRITE* line is driven high by the master to indicate, as noted previously, that the operation to follow is a READ operation.

Because the DS1* line is not used during a fast transfer mode operation, the line remains high throughout the entire operation.

In response to the WRITE* line being driven high, data is broadcast by the slave on lines D00 through D31.

DS0* is driven low and the signal subsequently deasserted by being driven high, as shown in FIG. 10. The slave, in response to DS0* being driven low, subsequently acknowledges the data transfer by driving DTACK* low for a given period and then deasserting the signal by driving the DTACK* line high. The data being broadcast by the slave as DTACK* is driven low is latched by the master, in response to the DTACK* signal being driven low. After DTACK* is driven low, the slave broadcasts the next segment of data to be transferred to the master over lines D00 through D31, as shown in FIG. 10. DS0* is not reasserted until the slave acknowledges the data transfer by driving the DTACK* line low.

As noted previously, the data transfer cycles will continue until all of the data to be transferred has been broadcast to the master. The number of cycles required to complete the transfer would occur at box 1000 in FIG. 10. Box 1000 is merely exemplary and not drawn to a particular time scale. FIG. 10A illustrates a data transfer cycle which could be inserted in the location of box 1000 in FIG. 10. As shown in FIG. 10A, DS0* is driven low. In response to the DS0* low signal, the slave acknowledges the data transfer by driving DTACK* low. In response to the DTACK* low signal, the master latches the data broadcast at the time DTACK* went low. The slave broadcasts the next segment of the data to be transferred. This operation would continue until all data has been transferred.

Referring again to FIG. 10, after the data transfer operation has been completed the slave drives DTACK* low. In response, the master deasserts AS* by driving the AS* line high. The master likewise releases the WRITE* line.

As already noted with regard to the WRITE operation, the durations of the respective DS0* and DTACK* signals can vary depending upon the application and the system being used. Likewise, the period between the assertion of DS0* and the assertion of DTACK* may also vary depending upon the application and the system being used. Obviously, the data transfer rate will be increased if the duration of the DS0* and DTACK* signals and the period between the assertion of DS0* and DTACK* are minimized.

Because the fast transfer protocol requires that data signals remain on the DTB for a very short period of time, the amount of skew between the control signals and the data signals must be minimized. For example, the DTACK* signal, which references data transfer on a BLOCK READ cycle, must go from high to low in the shortest possible interval so as to provide the master the maximum amount of time, under the circumstances, to capture the data to be transferred.

Figure 11:
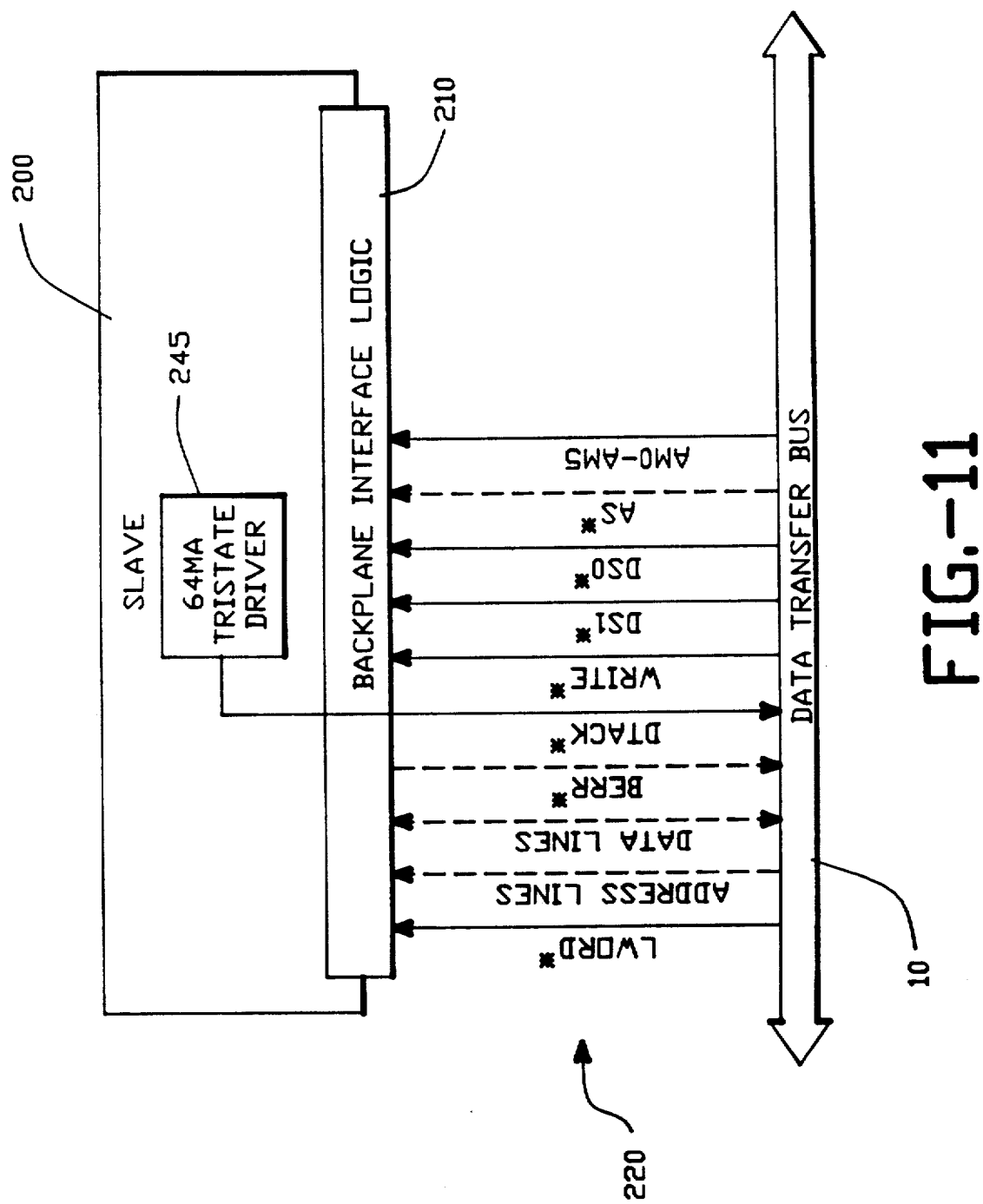
FIG. 11 is a block diagram illustrating the principal signal lines logically connecting the data transfer bus to a modified slave functional unit, as implemented in the preferred embodiment of the present invention.

To implement the fast transfer protocol, a conventional 64 mA tri-state driver 245 is substituted for the 48 mA open collector driver conventionally used in the slave module to drive DTACK* as shown in FIG. 11. This substitution is necessary because the 48 mA open collector DTACK* driver does not drive DTACK* from high to low quickly enough for purposes of the present invention. Implementation of the 64 mA tri-state driver 245 provides a means of quickly changing the state of the DTACK* signal so as to reduce skew between the DTACK* and data signals sufficient for purposes of the present invention.

It should likewise be noted that the data drivers on master and slave modules have been modified. To implement fast transfer protocol in the preferred embodiment of the present invention, the conventional VMEbus data drivers should be replaced with 64 mA tri-state drivers in SO-type packages. This modification reduces the ground lead inductance of the actual driver package itself and, thus, reduces "ground bounce" effects which contribute to skew between data, DS0* and DTACK*.

Further, in order to maximize performance, signal return inductance along the bus backplane should be reduced to a level permitting the short signal activation times necessary to implement the fast transfer mode protocol. In the preferred embodiment of the present invention, signal return inductance is reduced using a connector system having a greater number of ground pins so as to minimize signal return and mated-pair pin inductance. One such connector system is the "High Density Plus" connector, Model No. 420-8015-000, manufactured by Teradyne Corporation.

IV. Bus Locking FIFO Message Passing Protocol

While the enhanced fast transfer protocol provides for the expedient block transfer of message data, the present invention further and in combination provides for a similarly expedient delivery of message descriptors between the processors. These message descriptors are used, in the preferred embodiments of the present invention, to deliver the information necessary for the processor that receives a message descriptor to locate a data block and initiate an enhanced fast transfer protocol block transfer.

Figure 12:
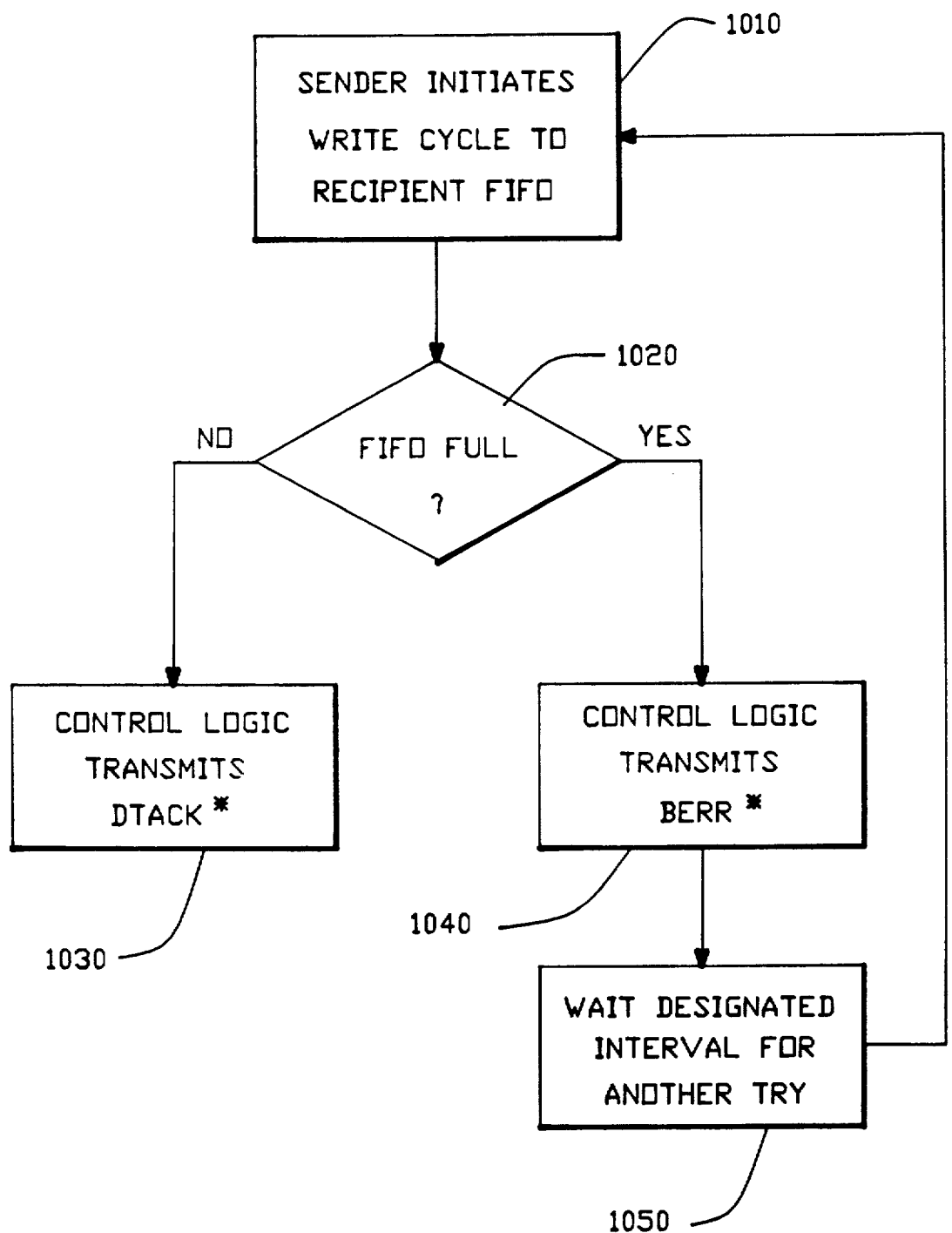
FIG. 12 is a flowchart illustrating a message data transfer operation accomplished under the present invention.

FIG. 12 is a flowchart illustrating a message descriptor transfer operation accomplished in accordance with the present invention. A sender processor (hereinafter "sender"), not shown in FIG. 12, may initiate a message descriptor transfer, 1010, by initiating a WRITE cycle, as described above, to a FIFO, not shown in FIG. 12, associated with a recipient processor (hereinafter "recipient") over the VMEbus. Message descriptors may contain data of any type. Preferably, the message descriptor consists of an address pointer to a data packet. In the preferred embodiments of the present invention, a message descriptor contains a shared memory address of a data pocket or block that is to be transferred to the message descriptor recipient processor. This recipient processor will act as the master processor in initiating an enhanced fast transfer protocol block transfer of the data block from the shared memory address provided by the message descriptor to a memory location of the recipient processor's own choosing.

In the transfer of a message descriptor from a sender to a receiver, if the recipient processor's FIFO is not FULL and a message descriptor WRITE operation is successful, the recipient's control logic will acknowledge the message descriptor transfer by transmitting a DTACK* signal to the sender, 1030.

If the FIFO being written to by the sender is full, 1020, the recipient's control logic will drive BERR* low, 1040, indicating a BUS ERROR, i.e., a bus lock on the message descriptor write operation. This informs the sender that the WRITE operation was unsuccessful. The sender will then wait for a designated period of time, 1050, before attempting to retry the WRITE intended operating circumstances. The waiting time is determined by the application. After waiting the designated interval, 1050, the sender will retry the WRITE operation, 1010. This process will continue until the message descriptor fast transfer operation is successful (i.e., the sender receives DTACK* rather than BERR*).

Figure 13:
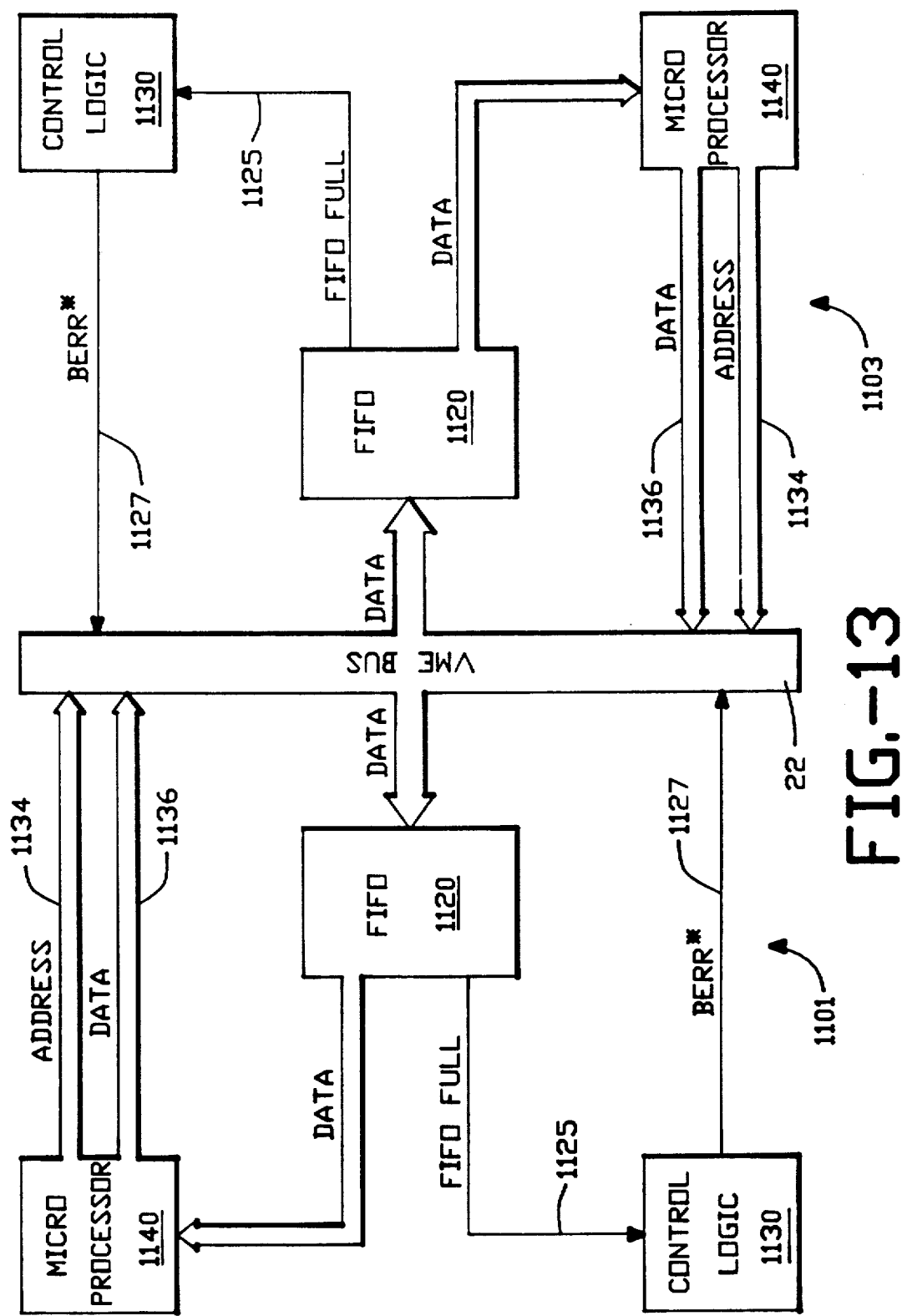
FIG. 13 is a block diagram of the bus-locking FIFO multi-processor communication system of the present invention.

FIG. 13 is a block diagram of the bus locking multiprocessor communication system. A processor 1101 and a processor 1103 are each interconnected to VMEbus 22. It should be understood that either of the processors 1101 and 1103 may send or, alternatively, receive message descriptors across VMEbus 22.

A message descriptor is transmitted by a sender, 1101 for example, across VMEbus 22 to FIFO 1120 of a recipient, 1103 for example. To initiate a transfer, the sender's microprocessor 1140 broadcasts the descriptor, one word typically, and its address across the VMEbus 22. The address broadcast by the sender corresponds to the bus address of recipient's FIFO. If the FIFO 1120 is either empty or not full, the message descriptor is received by and stored in FIFO 1120. The message descriptor can then be transferred from FIFO 1120 to the microprocessor 1140 for processing.

If the recipient FIFO 1120 is full, the FIFO 1120 transmits a FIFO FULL signal along the FIFO FULL line 1125 to the recipient processor's control logic 1130. In response to receiving a FIFO FULL signal, the recipient's control logic 1130 generates a BERR* signal by driving BERR* line 1127 low.

Figure 14:
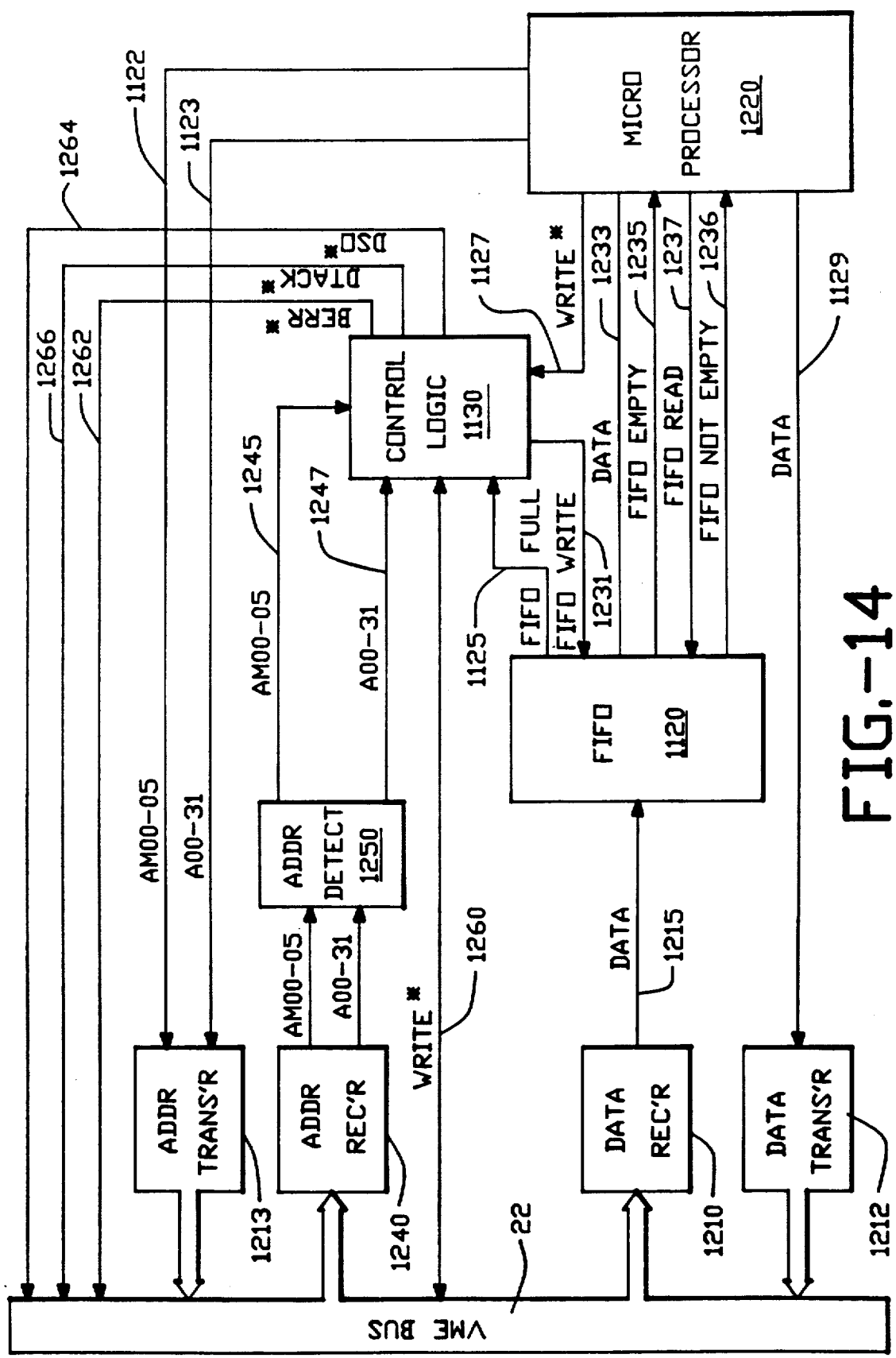
FIG. 14 is a block diagram of the preferred embodiment of one of the processors employed in the bus-locking FIFO multi-processor communication system of the present invention.

FIG. 14 is a block diagram of the preferred embodiment of one of the message transfer units of the bus-locking multi-processor communication system of the present invention. A message descriptor is transmitted by the sender processor, not shown in FIG. 14, across VMEbus 22 and is received at the recipient processor by a data receiver 1210. Similarly, the address and address modifier, also transmitted by the sender processor across VMEbus 22, are received by address receiver 1240 and forwarded to an address detect circuit 1250. The address detect circuit detects the address and address modifier and enables the control logic 1130. The address and address modifier transmitted by the sender processor, not shown in FIG. 14, is supplied to the control logic 1130 by lines 1247 and 1245 respectively. The transmitted address designates the FIFO 1120 as the intended recipient.

FIFO 1120 is a conventional FIFO having at least three data storage states: a "FIFO full" state, indicating that all FIFO storage locations are full and cannot store any further data, a "FIFO not full" state, indicating that some but not all, of the memory storage locations are available for the storage of message descriptors, and a "FIFO empty" state, which indicates that all memory storage locations are available for the storage of message descriptors.

The FIFO 1120 has a FIFO FULL signal output line 1125 interconnected to the control logic 1130. The FIFO FULL line 1125 is activated by the FIFO 1120 when a "FIFO full" state exists and a sender processor is attempting to write a message descriptor into a full FIFO 1120. A FIFO EMPTY signal line 1235 is interconnected to the control microprocessor 1220 and signals the microprocessor 1220 in the event FIFO 1120 is empty. A FIFO NOT EMPTY signal line 1236 is interconnected to control microprocessor 1220 to signal the control microprocessor 1220 that a message descriptor is resident in some of the FIFO's 1120 storage locations.

Data input lines 1215 interconnect the data receiver 1210 to the FIFO 1120. Data is output from the FIFO 1120 to the control microprocessor 1220 across data lines 1233. Two control lines, FIFO WRITE 1231 interconnected to the control logic 1130 and FIFO READ 1237 interconnected to the microprocessor 1220, control the flow of data to and from the FIFO 1120.

WRITE* signal line 1127 interconnects microprocessor 1220 to control logic 1130 and is driven low in the event the microprocessor 1220 desires to initiate a data WRITE operation. Data lines 1129 interconnect microprocessor 1220 to data transceiver 1212. Similarly, address lines 1123 and address modifier lines 1122 interconnect microprocessor 1220 and address transceiver 1213. Data transceiver 1212 transmits and receives data directed, respectively, to and from VMEbus 22. Likewise, address transceiver 1213 transmits and receives address and address modifier signals directed, respectively, to and from VMEbus 22.

Control logic 1130 is interconnected to VMEbus 22 by WRITE* line 1250, BERR* line 1262, DTACK* line 1264 and DSO* 1266. The WRITE* line 1250, DTACK* line 1264 and DSO* line operate in the manner described above. If the message descriptor WRITE operation is successfully accomplished, the recipient processor acknowledges the transfer by having control logic 1130 drive DTACK* low.

If a sender's processor, not shown in FIG. 14, is attempting to write a message descriptor into the FIFO 1120 when a FIFO full state condition exists, the FIFO activates FIFO FULL line 1125. Upon receipt of the FIFO FULL signal across FIFO FULL line 1125, conol logic 1130 drives BERR* line 1250 low indicating the sender that the WRITE operation was unsuccessful. The sender may, upon receipt of the BERR* signal, loose to retransmit the message descriptor to the recipient.

If the FIFO is not full and the WRITE operation was successful, the message descriptor is stored in the FIFO 120 for subsequent access and use by the recipient microprocessor 1220. Successful message descriptor transfers conclude with a DTACK* signal generated by the recipient processor's control logic 1130.

The processor system shown in FIG. 14 can also be used to transmit message descriptors. To transmit a message descriptor to a recipient processor connected along VMEbus 22, the microprocessor 1220 compiles the message data to be transferred in a "message buffer" located in shared VME bus address space. The address of the intended recipient FIFO and address modifier are transmitted to the address transceiver 1213. The microprocessor 1220 drives WRITE* line 1127 low. In response, control logic 1130 drives the WRITE* line 1260 low to indicate that the processor is instituting a WRITE operation. A message descriptor, which is an address pointer to the "message buffer", is transmitted by microprocessor 1220 to the data transceiver 1212. The descriptor, address, and address modifier are broadcast by respective transceivers across VMEbus 22. As noted above, if the addressed FIFO is full, the processor will receive a BERR* signal, indicating the message descriptor WRITE operation was unsuccessful.

V. Storage Control Processor

Figure 15:
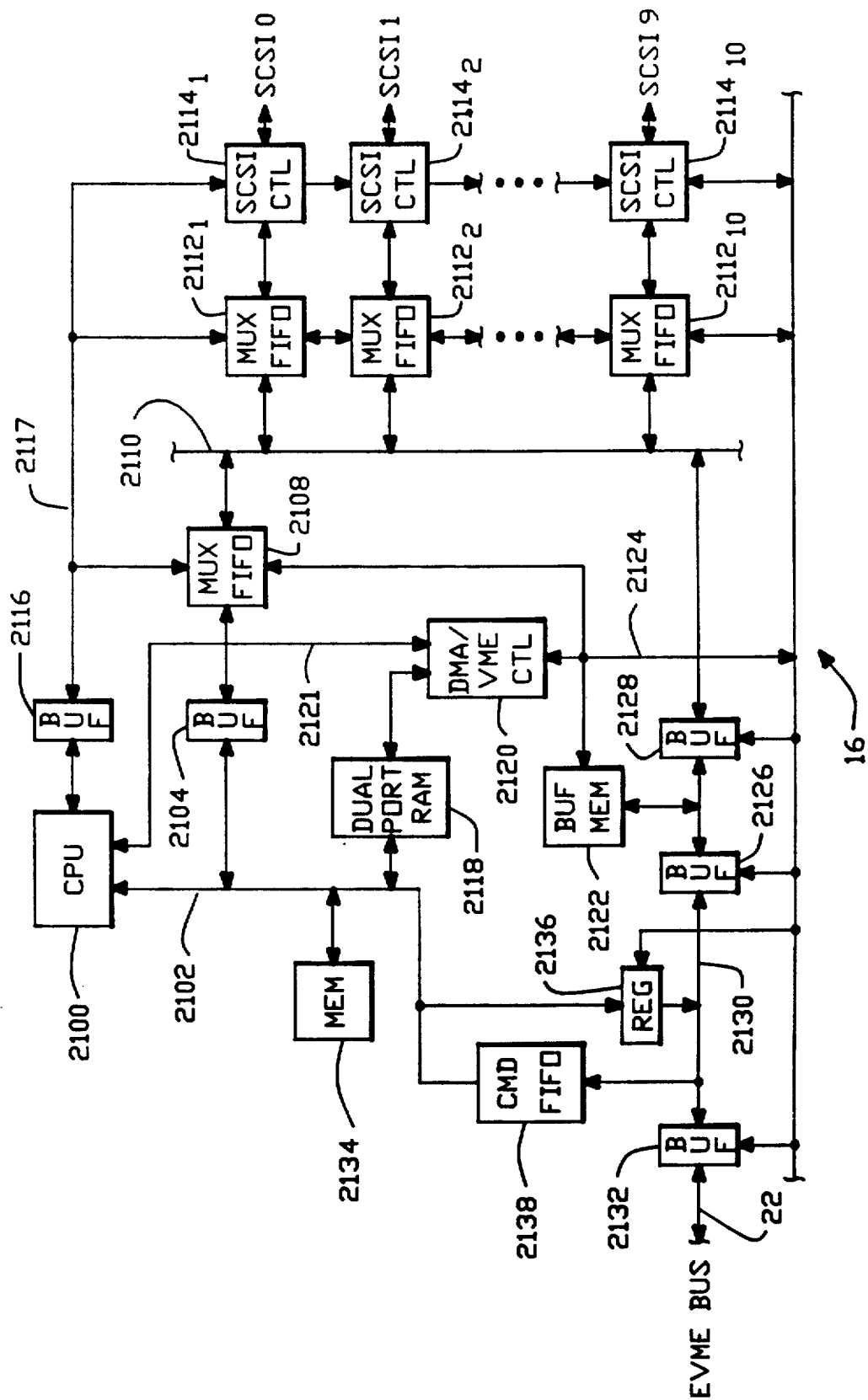
FIG. 15 is a block diagram of a storage processor implementing a multiple source/multiple destination data facility utilizing a preferred embodiment of the present invention.

A block diagram of a storage processor 16, representing an exemplary enhanced VMEbus master processor embodying the present invention, is provided in FIG. 15. A CPU 2100, preferably a Motorola 68020 processor, is coupled through a local CPU address, control and 32-bit wide data bus 2102 and a 32-bit wide buffer 2104 to a double-buffered multiplexing FIFO 2108 that is, in turn, connected to an internal 32-bit wide peripheral data bus 2110. The internal peripheral data bus 2110 is, in turn, coupled through a parallel channel array of double-buffered multiplexing FIFOs 2112$_{1-10}$ to a like parallel channel array of SCSI channel controllers 2114$_{1-10}$. The SCSI controllers 2114$_{1-10}$ support the respective SCSI buses (SCSI0–SCSI9) that connect to a drive array 24A or B.

The double buffered multiplexing FIFOs 2108, 2112$_{1-10}$ each include a 16-bit to 32-bit wide data multiplexer/demultiplexer and a pair of internal 32-bit FIFO buffers. The 16-bit side of each data multiplexer/demultiplexer is coupled respectively through the buffer 2104 to the lower 16-bit data portion of the local CPU bus 2102 or to the 16-bit data ports of the SCSI controllers 2114$_{1-10}$. The 32-bit side of each data multiplexer/demultiplexer and a second 32-bit port of each double buffered multiplexing FIFO 2108, 2112$_{1-10}$ are selectably couplable to the pair of internal FIFO buffers. Thus, for example in the preferred embodiment of the present invention, a first internal FIFO is coupled through the data multiplexer/demultiplexer to the 16-bit wide data port of SCSI controller 2114$_1$. The second internal FIFO is coupled to a secondary data bus 2110. These internal FIFO buffers of the multiplexing FIFO 2112$_1$ may be swapped between their logical internal connections ultimately connected to the SCSI controller 2114$_1$ and the secondary data bus 2110. Thus, a large difference in the data transfer rate between the CPU 2100 and the SCSI controllers 2114$_{1-10}$ and the secondary data bus 2110 can be maintained for a burst data length equal to the depth of the internal FIFOs of the multiplexing FIFOs 2108, 2112$_{1-10}$.

Control over the initialization and operation of the double buffered multiplexing FIFO 2112$_{1-10}$ and SCSI controller 2114$_{1-10}$ arrays is, in general, performed by the CPU 2100 via a memory-mapped buffer 2116 and control/data bus 2117. However, control with respect to the transfer of data bursts is handled by a DMA controller 2120 that controls the low level transfer of data between the double-buffered multiplexing FIFOs 2108, 2112$_{1-10}$, the temporary store buffer memory 2122 and the enhanced VME bus 22. Communication between the CPU 2100 and the DMA controller 2120 is through a dual port SRAM command block 2118. A first address and data port of the dual port SRAM command block 2118 is coupled directly to the local CPU bus 2102, while the second address and data port of the SRAM block 2118 is coupled via an address and data bus 2157 to the DMA controller 2120. A dedicated status and control bus 2121 allows the CPU 2100 to monitor and enable the general function of the DMA controller 2120.

In accordance with a preferred embodiment of the present invention, the DMA controller 2120 responds to commands and accompanying data posted by the CPU 2100 in the dual-ported SRAM block 2118 to select any of the double-buffered FIFOs 2108, 2112$_{1-10}$, the buffer memory 2122, and the enhanced VME bus 22 as a source or destination of a data block transfer. To accomplish this, the DMA controller 2120 is coupled through a control bus 2124 to the double buffered FIFOs 2108, 2112$_{1-10}$, the buffer memory 2122, a pair of secondary data bus buffers 2126, 2128, and the enhanced VME control, address and logic buffer 2132. The buffers 2126, 2128 are used, under control of the DMA controller 2120, to route data by variously coupling the internal peripheral data bus 2110 to a secondary data bus 2130 and the buffer memory 2122.

Finally, a one megabyte local shared memory block 2134, a high speed buffer and register array 2136, and a preemptive write message descriptor FIFO 2138 are provided connected directly to the local CPU data bus 2102. The buffer 2136 and message descriptor FIFO 2138 are also coupled to the secondary data bus 2130.

VI. High Speed, Data Burst DMA Controller

Figure 16:
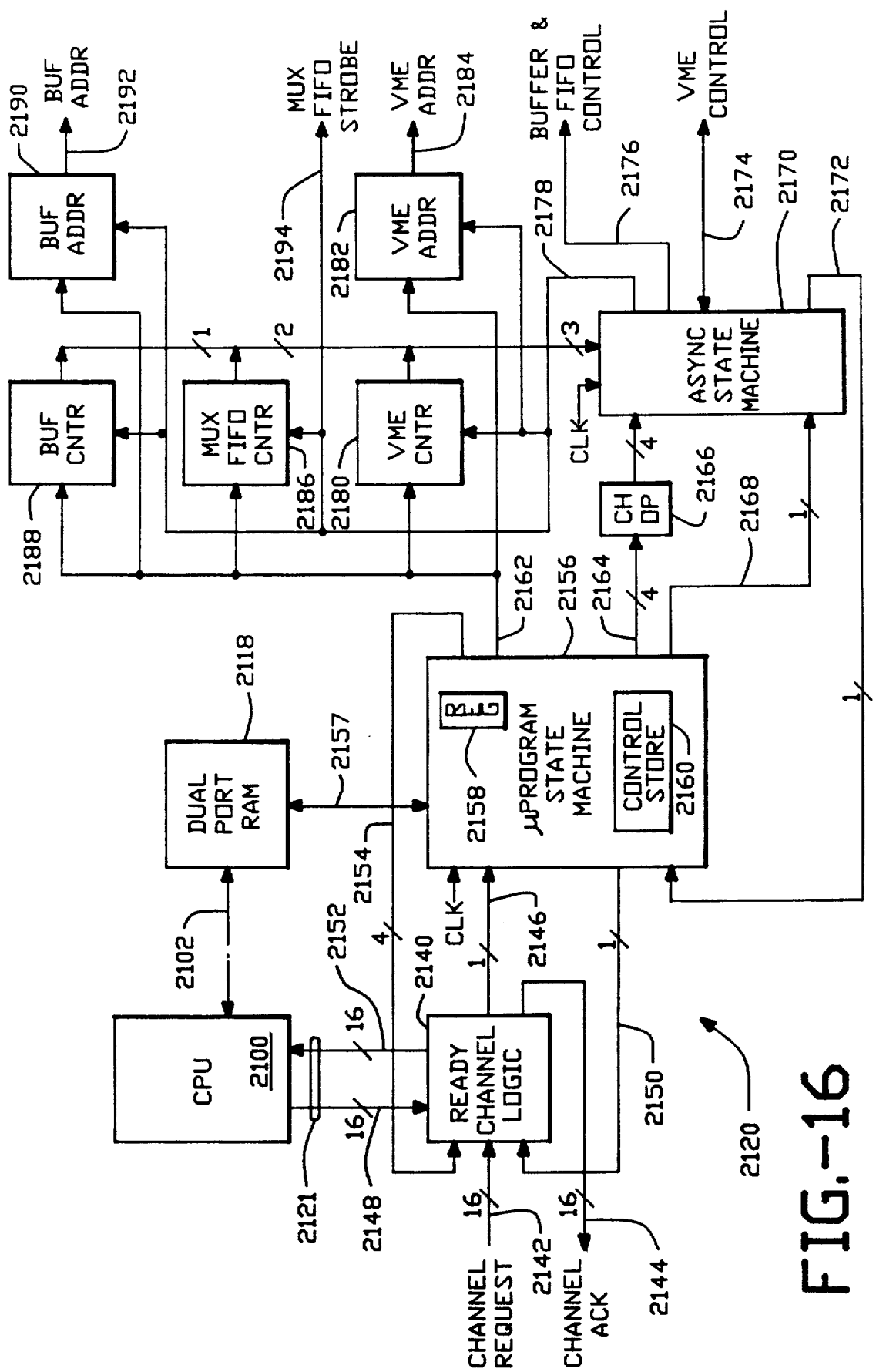
FIG. 16 is a block diagram of a preferred embodiment of the multiple processor, high speed, flexible source/destination data burst direct memory access controller of the present invention.

The DMA controller 2120, as implemented in accordance with a preferred embodiment of the present invention, is shown in FIG. 16. The primary elements of the DMA controller 2120 include a ready channel logic block 2140 for selecting one of up to sixteen (in the preferred embodiment of the present invention) data block source channels, an asynchronous state machine 2170 that directly controls the data block transfer and a microprogrammed state machine 2156 for controlling the logic block 2140, for obtaining the channel operation and control data from the SRAM block 2118 and for initializing and enabling the asynchronous state machine 2170.

The ready channel logic block 2140 receives channel requests on lines 2142 indicating that respective sources of data block transfers are ready for a transfer of data. Table 1 sets forth the set of channel request sources present in the storage processor 16:

TABLE 1

| Channel | Function |
| --- | --- |
| 0 | SCSI 0 FIFO |
| 1 | SCSI 1 FIFO |
| 2 | SCSI 2 FIFO |
| 3 | SCSI 3 FIFO |
| 4 | SCSI 4 FIFO |
| 5 | SCSI 5 FIFO |
| 6 | SCSI 6 FIFO |
| 7 | SCSI 7 FIFO |
| 8 | SCSI 8 FIFO |
| 9 | SCSI 9 FIFO |
| A | VME ⇌ Buffer (2122) |
| B | VME ⇌ Buffer (2122) |
| C | RAM Refresh |
| D | CPU FIFO (2108) |
| E | High Speed Reg. Write (2136) |
| F | Null Channel (Not Used) |

Each request channel of the ready channel logic block 2140 is independently enablable by the CPU 2100 via channel enable lines 2148. The ready channel logic block 2140 tests the request line state and enable line state of each request channel in response to a four bit binary code presented to the logic block 2140 on polling channel select lines 2154. If the identified channel is requesting an data block transfer and is enabled by the CPU 2100, then a channel ready signal is provided to the microprogrammed state machine 2156 via line 2146. An acknowledge signal is returned to the requesting channel via a corresponding one of the channel acknowledge lines 2144. Also, a corresponding channel status signal is provided to the CPU 2100 via lines 2152. The channel status signal is reset upon receipt of a transfer completed signal on line 2150.

The microprogrammed state machine 2156 continuously executes a microcode program stored in its control store 2160. The microcode program implements an iterating polling loop. With each iteration, a four bit value is programmed into an internal register 2158 and, from there, output on to the channel select lines 2154. If a channel ready signal is not, in turn, received on the channel ready line 2146, the next iteration of the microcode program is executed. However, if the selected channel signals ready, then the microprogram state machine 2156 accesses a corresponding channel control structure storage location within the dual port SRAM block 2118 to obtain control data pertinent to the requested data block transfer. The channel control structure is described in Section VII below.

The channel control structures are maintained and updated by the CPU 2100. During an update of the control information, the corresponding channel is disabled by withdrawal of the relevant enable signal on lines 2148. However, the dual port nature of the SRAM block 2118 permits the microprogrammed state machine to continue execution concurrently with respect to all enabled channels. Consequently, the CPU 2100 has a minimum of required overhead—updating the channel control structures in the dual port SRAM block 2118 which may be done by the CPU 2100 essentially independent of the concurrent operation of the DMA controller 2120—to select and effect the high-speed transfer of a data block.

Once a channel control structure is identified for retrieval from the dual port SRAM block 2118, the microprogrammed state machine 2156 tests the state of a burst transfer completed signal provided from the asynchronous state machine 2170 on line 2172. If a burst transfer is currently in progress, the transfer completed signal is not asserted and the microprogrammed state machine 2156 waits for the eventual assertion of the transfer completed signal. As soon as the transfer completed signal is asserted, the microprogrammed state machine 2156 programs the channel operation (CH OP) register 2166 with the channel control structure specified channel operation code via the 4-bit wide bus 2164. Table 2 sets forth the set of channel operations available in the storage processor 16:

TABLE 2

| Code | Operation |
| --- | --- |
| 0 | Zero → Buffer |
| 1 | VME → FIFO |
| 2 | VME → Buffer |
| 3 | VME → FIFO & Buffer |
| 4 | FIFO → Buffer |
| 5 | FIFO → Null |
| 6 | FIFO → VME |
| 7 | FIFO → VME & Buffer |
| 8 | Buffer → Null |
| 9 | Buffer → FIFO |
| 10 | Buffer → VME |
| 11 | Zero → FIFO |
| 12 | No Op |
| 13 | No Op |
| 14 | Zero → VME |
| 15 | Reg → VME |

The "zero" data source operations provide for the block transfer of data zeros as may be desired to initialize destination data locations. The "FIFO" data source and destination operations do not specify the particular double-buffered FIFO 2108, $2112_{1-10}$ that is to participate in the data block transfer. Rather, only the one double-buffered FIFO 2108, $2112_{1-10}$ that has received a channel acknowledgement signal via lines is enabled and active on the bus 2110. The "FIFO & Buffer (2122)" and "VME & Buffer (2122)" data destinations provide for the mirror destination transfers from a single data source using the data buffers 2126, 2128 and 2132 to route the data flow between the double-buffered FIFOs 2108, $2112_{1-10}$, buffer 2122 and the VMEbus 22.

The microprogrammed state machine 2156 also programs a VME burst length counter 2180, a VME address register 2182, a double-buffered FIFO burst length counter 2186, a data buffer burst length counter 2188 and a buffer address register 2190 with corresponding channel control structure specified values. The burst length counters are used as count-down counters by the asynchronous state machine 2170, while the buffer and VME address registers are used as count-up counters to drive the buffer address lines 2192 and the address lines 2184 of the VMEbus 22. An address register is not required for the double-buffered FIFOs 2108, $2112_{1-10}$ as the addressing of their internal FIFOs is inherent from the receipt of a data transfer strobe signal on line 2194.

Once the next burst transfer operation has thus been initialized by the microprogrammed state machine 2156 for the asynchronous state machine 2170, an enable signal is provided via line 2168. The asynchronous state machine 2170 then executes a data burst transfer operation. Timing signals are issued via lines 2178 to the counters 2180, 2186, 2188, address registers 2184, 2190 and double-buffered FIFOs 2108, $2112_{1-10}$ to generate the source or destination addresses, or both, for the burst transfer. Read, write and related control signals are also provided to the buffer and double-buffered FIFOs 2108, $2112_{1-10}$ in support of the data burst transfer via control lines 2176. Finally, the asynchronous state machine 2170 connects with the control portion of the VMEbus 22 via the VME control lines 2174 to interact with other processors and system resources connected to the VMEbus 22

Preferably and typically, the asynchronous state machine 2170 operates as a bus master using the enhanced VMEbus fast transfer protocol to burst transfer a data block to or from the system memory 18. The actual execution of the burst transfer is, significantly, independent of any operation by either the CPU 2100 or the microprogrammed state machine 2156. Consequently, the microprogrammed state machine 2156, once it has enabled the asynchronous state machine 2170, is free to continue execution of its control program to select and prepare a next channel for the transfer of a data burst so as to minimize the time needed to initialize the asynchronous state machine for a next data burst transfer.

VII. Dual Port Ram Channel Control Structures

The dual port SRAM block 2118 is used to store the channel control structures necessary for the CPU 2100 to specify to the DMA controller 2120 the channel operation to be performed and the data that is to be transferred by the channel operation. The dual port SRAM block 2118 is preferably organized as 1K × 32 at its connection to the local CPU bus 2102 and as 2K × 16 at the address and data bus 2157 to the DMA controller 2120 and specifically the microprogrammed state machine 2156.

The channel control structures include channel control blocks and channel parameter blocks. A control block is generally provided for each of the data channels identified in Table 1. However, the control block for channel "C" (RAM refresh) is not used since the CPU never specifies any data to be transferred on that channel. Similarly, there is no control block required for the null channel "F"; it is, in the preferred embodiment, omitted entirely. Table 3 defines the preferred control block structure, aligned at offset 0 in the dual port SRAM block 2118. Parameter blocks are present, as necessary, at the end of the control block structure.

TABLE 3

| OFFSET | 31 | 0 |
|---|---|---|
| 0 | CURR POINTER 0 | STATUS 0 |
| 4 | INITIAL POINTER 0 | |
| . | | |
| . | | |
| 50 | CURR POINTER 9 | STATUS 9 |
| 54 | INITIAL POINTER 9 | |
| 58 | CURR POINTER A | STATUS A |
| 5C | INITIAL POINTER A | |
| 58 | CURR POINTER B | STATUS B |
| 5C | INITIAL POINTER B | |
| 60 | not used | not used |
| 64 | not used | not used |
| 68 | CURR POINTER D | STATUS D |
| 6C | INITIAL POINTER D | |
| 70 | not used | STATUS E |
| 74 | HIGH SPEED BUS ADDRESS 31:2|0|0 | |
| 78 | PARAMETER BLOCK 0 | |
| . | | |
| . | | |
| ?? | PARAMETER BLOCK n | |

The "initial pointer", as used for channels 0-B, and D, is a 32-bit address value which points the first parameter block, of a possible series of parameter ks, that define the channel operations pending for that channel. The "current pointer" is a sixteen bit address value used by the DMA Controller 2156 to point to the current parameter block. The current pointer is preferably initialized to zero by the CPU 2100 before enabling the channel. Upon selecting a channel for executing a channel operation and detecting a value of zero in the current pointer, the DMA Controller 2156 copies the lower 16 bits from the initial pointer to the current pointer. The DMA Controller 2156 then performs the operations specified in the identified parameter block. Once the parameter block specified channel operation is completed, the DMA Controller 2156 updates the current pointer with the address of the next parameter block, if any, pending for that channel. If there are no further pending parameter blocks, the pointer will be reset to zero.

The "status" values are single bytes indicating the ending status for the last channel operation performed for the respective channels. Table 4 provides the defined status values and their meanings for the preferred embodiments of the present invention.

TABLE 4

| Status | Meaning |
|---|---|
| 0 | NO ERRORS |
| 1 | ILLEGAL OP CODE |
| 2 | BUS OPERATION TIMEOUT |
| 3 | BUS OPERATION ERROR |
| 4 | DATA PATH PARITY ERROR |

Uniquely for the control block "E", no current ponter is provided. Rather, the only valid fields are status and, in place of an initial pointer, high speed register address. When a channel "E" operation is enabled by the CPU 2100, the DMA controller 2120 writes the data present in the high speed register 2136 to the VME address specified in the high speed register address field of the channel "E" control block.

Table 5 defines the preferred parameter block structure, relative to the end of the control block structure or an intervening parameter block.

TABLE 5

| OFFSET | 31 | | 0 |
|---|---|---|---|
| 0 | FORWARD LINK | | |
| 4 | NOT USED | WORD COUNT | |
| 8 | VME ADDRESS 31:2, ENH, BLK | | |
| C | TERM 0 | OP 0 | BUF ADDR 0 |
| . | | | |
| . | | | |
| C + (4Xn) | TERM n | OP n | BUF ADDR n |

The fields contained in the parameter blocks are defined as follows:

FORWARD LINK—The forward link points to the first word of the next parameter block pending for the current channel. This allows several parameter blocks to be initialized and chained in a single linked list to define a sequence of channel operations that are to be performed for the current channel. The forward pointer has the following format:

<A31:A2,0,0>

The format dictates that the parameter block must start on a quad byte boundary. A pointer of zero is a special case which indicates no forward link, i.e., no further parameter blocks for the current channel, exists.

WORD COUNT—The word count specifies the number of quad byte words that are to be transferred to or from each buffer 2122 address or to or from a VME address. A word count of 64K words may be specified by initializing the word count with the value of 0. The word count is updated by the DMA controller 2156 at the completion of a transfer to/from the last specified buffer 2122 address. A word count of zero (negative) after being updated by the DMA controller 2156 signifies that the data transfer defined by the parameter block has been completed. In the preferred embodiments of the present invention, the word count value is not updated after each transfer to or from each buffer address and is therefore not an accurate indicator of the total data moved to or from the buffer 2122. Instead the word count value represents the current amount of data remaining to be transferred to the VME bus 22 or the double-buffered FIFOs 2108, 2112$_{1-10}$.

VME ADDRESS—The VME address specifies the starting address for data transfers. Thirty bits of addressing allows the address to specify any quad byte boundary.

ENH—This bit, when set, selects the enhanced fast transfer protocol to be used during the VMEbus transfer. The enhanced fast transfer protocol will be disabled automatically when performing any transfer to or from 24 bit or 16 bit address space, when the starting address is not 8 byte aligned or when the word count is not even.

BLK—This bit, when set, selects the conventional VME block mode protocol to be used during the VMEbus transfer. Block mode will be disabled automatically when performing any transfer to or from 16 bit address space.

The remaining fields (TERM x, OP x, and BUF ADDR x) can be repeated as a group so as to define quite complex data transfers with respect to the buffer 2122. A specific application of this capability include gather data operations on data stored non-contiguously in the buffer 2122 for writing out to disk.

BUF ADDR—The buffer address specifies the starting address for obtaining or storing data in the buffer 2122 depending on the current channel operation. Only 16 bits, <A19:A4> are available to address the preferably 1 Megabyte buffer 2122 and, as a result, the starting address must always fall on a 16 byte boundary. Since transfers to and particularly from the double-buffered FIFOs 2108, 2112$_{1-10}$ are done in 128 byte bursts in the preferred embodiments of the present invention, the starting BUF ADDR address must further be limited to a modulo 128 byte boundary. The BUF ADDR address value is updated by the DMA controller 2156 after completion of each buffer 2122 data transfer burst.

OP—Channel operations are specified by the op code. Table 6 sets forth the set of recognized DMA controller 2156 channel operations:

TABLE 6

| Code | Operation |
|------|-----------|
| 0 | No Op |
| 1 | Zero → Buffer |
| 2 | Zero → FIFO |
| 3 | Zero → VME |
| 4 | VME → Buffer |
| 5 | VME → FIFO |
| 6 | VME → VME & Buffer |
| 7 | Buffer → VME |
| 8 | Buffer → FIFO |
| 9 | FIFO → VME |
| 10 | FIFO → Buffer |

TABLE 6-continued

| Code | Operation |
|------|-----------|
| 11 | FIFO → VME & Buffer |
| 12 | Reserved |
| 13 | Reserved |
| 14 | Reserved |
| 15 | Reserved |

TERM—The last group of buffer 2122 address and channel operation fields within a parameter block is identified by the terminal bit (least significant bit of the TERM byte). The DMA controller 2156 continues to fetch buffer addresses and operations (TERM x, OP x, and BUF ADDR x field groups) to perform until a set TERM bit is encountered. The channel operation of this last field group is then performed. The word counter is then updated and, so long as not equal to zero (negative), the series of operations defined by the current parameter block's series of TERM x, OP x, and BUF ADDR x field groups is repeated. Once the word counter does reach zero, the forward link pointer is used to access the next parameter block; the current pointer in the command block is also updated with the address provided by the forward link pointer.

The foregoing description of the present invention merely sets forth the preferred embodiment. Modifications and variations of the invention as described and set forth above may be made which are consistent with the scope and spirit of the present invention and the appended claims. Other aspects, objects and advantages of this invention can be obtained from a study of the drawing, the disclosure and the appended claims.

What is claimed is:

1. Apparatus providing for the high speed burst transfer of data blocks, said apparatus comprising:
 a) first means for identifying one or more data blocks for transfer from a data source to a data destination, wherein said first means prepares data defining the data transfer required for the transfer of a data block from said data source to said data destination, said prepared data, for each data block identified for transfer, identifying said data source, said data destination and an address defining the data transfer required for the transfer of said data block;
 b) a plurality of data channels, wherein said data source and said data destination are respective ones of said data channels, wherein each said data channel generates a data ready signal;
 c) second means responsive to an enable signal, for autonomously generating addressing signals and data transfer signals to control the transfer of a data block from said data source to said data destination, whereby said addressing signals and said data transfer signals select said data source and said data destination from among said data channels for the transfer of data therebetween, said second means generating a transfer done signal;
 d) third means, responsive to said first means, for initializing said second means for transfer of a data block determined by the data defining the data transfer prepared by said first means, said third means, in response to said transfer done signal, initializing said second means and providing said enable signal autonomously with respect to said first means, said third means including means for buffering said initialization state for said second means, said buffering means being coupled to said second means to transfer said initialization state to said second means in response to said transfer done signal, said third means generating said initialization state in response to said data ready signals and said data identifying said data source and said data destination incorporated in said data defining the data transfer required for the transfer of a data block; and e) control memory means, coupled between said first and third means, for storing control information, said first means storing the data defining the data transfer at a predetermined location within said control memory means, said control memory means providing access by said third means to read the data defining the data transfer at said predetermined location.

2. A system architecture providing for the high-speed transfer of data between multiple sources and destinations, said system architecture comprising:

a) main memory means for storing data accessible in response to address and control signals; and b) data processor means for controlling transfers of data between said main memory means and a plurality of data channels, each said data channel generating a channel request signal, said data processor means including:

i) first means for identifying data for transfer between respective data channels and said main memory means, said first means providing identification data with respect to each of said data channels for which data has been identified for transfer, each instance of said identification data identifying one of said data channels, one or more data blocks for transfer, and a direction of transfer;

ii) control memory means, coupled to said first means, for receiving and storing identification data;

iii) second means, coupled to said main memory means, for generating said address and control signals to control the transfer of said predetermined data block, said second means being initialized by transfer control data defining an initialization state of said second means with respect to said predetermined data block; and iv) third means, coupled to said control memory means, for selecting one of said data channels for the transfer of a data block in response to a unique correspondence between said channel request signals and said identification data, said third means generating said transfer control data based on said identification data for the selected one of said data channels.

3. The system architecture of claim 2 wherein said second means provides a transfer complete signal, wherein said third means includes buffer means, coupled to said second means, said buffer means providing for the storage of transfer control data, and wherein said third means is responsive to said transfer complete signal for enabling the transfer of transfer control data from said buffer means to said second means.

4. A system architecture providing for the high-speed transfer of data between multiple sources and destinations, said system architecture comprising:

a) main memory means for storing data accessible in response to address and control signals; and b) data processing means for controlling transfer of data between said main memory means and a plurality of data channels, each of said data channel generating a channel request signal, said data processor means including:

i) first means for identifying data for transfer between respective data channels and said main memory means, said first means providing identification data with respect to each of said data channels for which data has been identified for transfer, each instance of said identification data identifying one of said data channels, one or more data blocks for transfer, and a direction to transfer;

ii) control memory means, coupled to said first means, for receiving and storing identification data, said control memory means provides mutually independent access by said first and a third means to identification data stored in said control memory means;

iii) second means, coupled to said main memory means, for generating said address and control signals to control the transfer of said predetermined data block, said second means being initialized by transfer control data defining an initialization state of said second means with respect to said predetermined data block, said second means provides a transfer complete signal; and iv) said third means, coupled to said control memory means, for selecting one of said data channels for the transfer of a data block in response to a unique correspondence between said channel request signals and said identification data, said third means generating transfer control data based on said identification data for the selected one of said data channels, said third means further includes buffer means, coupled to said second means, said buffer means providing for the storage of said transfer control data, and wherein said third means is responsive to said transfer complete signal for enabling the transfer of transfer control data from said buffer means to said second means.

5. The system architecture of claim 4 wherein said control memory means includes a dual ported memory.

6. The system architecture of claim 4 wherein said third means provides an acknowledgement signal to the selected one of said data channels.

7. The system architecture of claim 4 wherein each of said plurality of data channels includes secondary memory means for storing data transferred in response to said address and control signals generated by said second means said system architecture further comprising bus means for interconnecting said main memory means with said secondary memory means to permit the transfer of data thereinbetween, said second means being coupled to said bus means for the provision of said address signals and the exchange of said control signals therewith, said main memory means including means, responsive to said address and control signals, for transferring data between said main memory means and said bus means.

8. The system architecture of claim 7 wherein said second means includes logic means for providing said control signals to said bus means in one of a plurality of predetermined sequences, said logic means being responsive to command data for selecting one of said predetermined sequences, said second means further including address counter means for providing a sequence of data addresses, burst counter means for signalling the end of a data transfer operation by said second means, and command means for receiving said command data, and wherein said third means, is coupled to said address counter means for providing an initial address value, said burst counter means for providing an initial data length value, and said command means for providing said command data.

* * * * *

UNITED STATES PATENT AND TRADEMARK OFFICE
CERTIFICATE OF CORRECTION

PATENT NO. : 5,175,825
DATED : December 29, 1992
INVENTOR(S) : DARYL D. STARR It is certified that error appears in the above-identified patent and that said Letters Patent is hereby corrected as shown below:

```
Column  6, line 27, after "5" insert --A--.
Column  7, line 64, after "16A-" delete "15".
Column 10, line  4, after "propagation" insert --1--.
Column 11, line 38, delete "FIGS." and insert --FIG.--.
Column 17, line 17, delete "pocket" and insert --packet--.
Column 17, line 36, after "WRITE" delete "intended operating
                    circumstances" and insert --operation--.
Column 17, line 38, delete "application" and insert --intended
                    operating circumstances--.
Column 18, line 20, delete "but not all,".
Column 22, line 35, after "via lines" insert --2144--.
Column 23, line 67, delete "ks" and insert --blocks--.
Column 24, line 32, delete "ponter" and insert --pointer--.
Column 28, line 46, delete "acknowledgement" and insert
                    --acknowledge--.
Column 28, line 52, after "means" insert --,--.
```

Signed and Sealed this

First Day of February, 1994

Attest:

BRUCE LEHMAN

*Attesting Officer*     *Commissioner of Patents and Trademarks*